United States Patent [19]

Bennett et al.

[11] 4,417,276

[45] Nov. 22, 1983

[54] VIDEO TO DIGITAL CONVERTER

[75] Inventors: Matthew C. Bennett, Ann Arbor; Donald R. Strange, Howell, both of Mich.

[73] Assignee: Medtronic, Inc., Minneapolis, Minn.

[21] Appl. No.: 254,771

[22] Filed: Apr. 16, 1981

[51] Int. Cl.³ .............................................. H04N 5/14
[52] U.S. Cl. .................................... 358/160; 358/180; 358/903; 358/138; 358/260; 358/335
[58] Field of Search .................... 358/12, 13, 127, 133, 358/180, 185, 160, 903, 96, 260, 140, 138, 335; 364/515; 340/146.3 MA

[56] References Cited

U.S. PATENT DOCUMENTS

| | | |
|---|---|---|
| 3,478,266 | 11/1969 | Gardenhire et al. . |
| 3,740,466 | 6/1973 | Marshall et al. . |
| 3,883,685 | 5/1975 | Yumde et al. . |
| 3,883,686 | 5/1975 | Jacobacus et al. . |
| 3,914,543 | 10/1975 | Kawahara et al. . |
| 4,075,658 | 2/1978 | Cosnac et al. ........................ 358/96 |
| 4,079,417 | 3/1978 | Scudder .......................... 358/180 X |
| 4,095,259 | 6/1978 | Sawagata . |
| 4,124,871 | 11/1978 | Morrin ............................. 358/96 X |
| 4,127,873 | 11/1978 | Katagi . |
| 4,143,401 | 3/1979 | Coviello ............................... 358/96 |
| 4,148,070 | 4/1979 | Taylor ................................ 358/160 |
| 4,183,058 | 1/1980 | Taylor . |
| 4,189,744 | 2/1980 | Stern .............................. 358/903 X |
| 4,193,096 | 3/1980 | Stoffel ................................ 358/260 |
| 4,242,707 | 12/1980 | Budai ............................ 358/160 X |
| 4,282,546 | 8/1981 | Reitmeier ....................... 358/160 X |
| 4,302,776 | 11/1981 | Taylor et al. ................... 358/138 X |
| 4,365,273 | 12/1982 | Yamada et al. ..................... 358/260 |

Primary Examiner—Robert L. Richardson
Attorney, Agent, or Firm—Merchant, Gould, Smith, Edell, Welter & Schmidt

[57] ABSTRACT

A method and apparatus by which video signals can be converted to digitized values and stored in memory. Means are provided for continuous digitization of successive images which may be stored in computer memory in real time. Additionally, means are provided for compression of adjacent picture elements to produce a spacially compressed image which takes up less memory space. Also disclosed are means for compressing successive frames so as to produce a temporally compressed image.

16 Claims, 32 Drawing Figures

Microfiche Appendix Included
(5 Microfiche, 312 Pages)

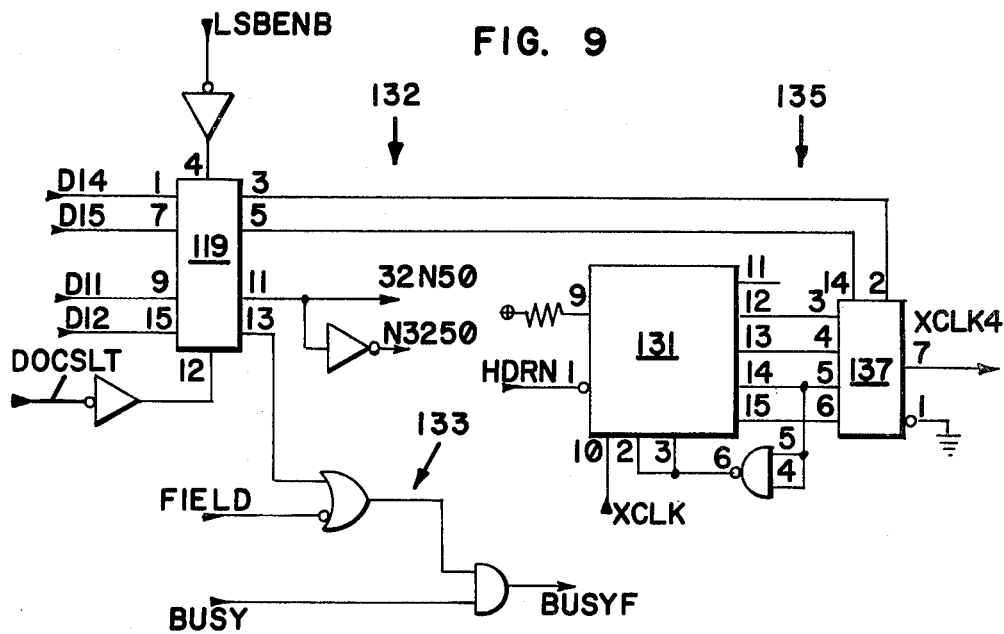
FIG. 9
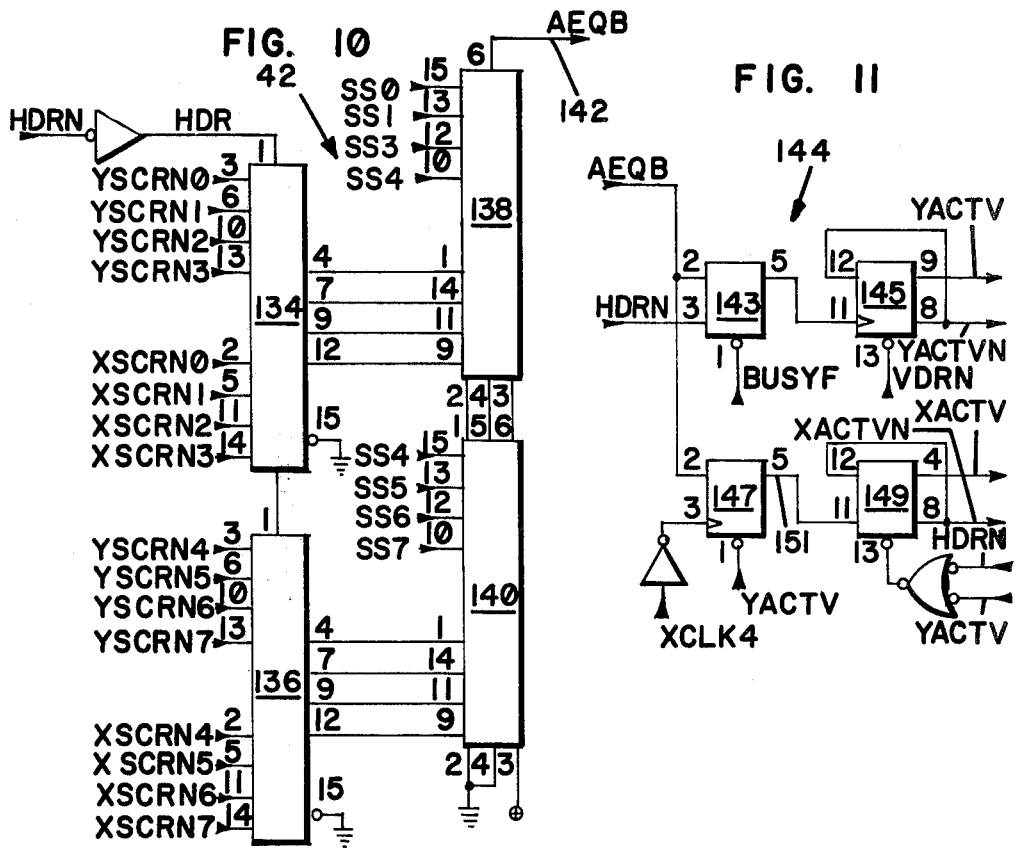
FIG. 10
FIG. 11

VIDEO TO DIGITAL CONVERTER

APPENDICES CROSS-REFERENCE

This application contains two appendices, Appendix A being a parts list and Appendix B being a Microfiche Appendix of 5 fiche and a total of 312 frames.

TECHNICAL FIELD

The present invention relates to a video signal conversion and storage system capable of digitizing information from a video signal using a raster scan and storing such digital data in a computer memory for playback and analysis. The present invention is capable of realtime acquisition of single or multiple images and provides for compression of such images and for zooming in on areas of particular interest.

BACKGROUND OF THE INVENTION

Digitizing of analog signals has long been used to provide an efficient basis on which the signals can be manipulated and analysed. In the medical field, for example, the outputs of nuclear or scintillation cameras have been digitized so that their images may be analyzed and displayed through a digital computer. Such nuclear imaging typically produces a single frame constructed over a long period of time (i.e., measured in minutes rather than in microseconds), and thus the digitization of these slowly forming images did not involve the problems inherent in digitizing high speed sequential imaging. With the advent of ultrasound radiographic and other types of video imaging, it has been possible to produce an output video signal employing a raster scan to show successive frames of an event as it occurs or, as it is commonly referred to in the art, "in real time". These video signals are typically recorded on videotape for later playback. Because the raster scan of a standard video signal produces 30 (or 25 depending on the television system employed) complete frames per second, the digitization of such a signal involves entirely new problems not encountered in single frame nuclear imaging.

Digitization of a raster scan requires both an extremely large memory system and the hardware capable of digitizing and storing this data at a very high rate of speed. Furthermore, if such a system is to be most effective in its intended environment, the hardware must be relatively portable so that it may be moved proximate the subject to be tested (such as at a patient's bedside). Because of these environmental requirements, it is necessary to provide hardware which can reduce memory requirements, and thus reduce the physical size of the memory required, by selecting the most pertinent data to be digitized or by compressing adjacent bits of data (pixels) into fewer number. With these schemes for better utilizing available memory space, it is possible to store a large number of sequential images in digital form.

SUMMARY OF THE INVENTION

The present invention is directed to a system for digitizing a video signal and storing in real time the digitized signal in a computer memory comprising means for converting an analog signal to digital form and establishing a main matrix of picture elements each having a numerical level corresponding to luminosity, means for locating a submatrix within said main matrix, and means for storing in memory picture elements of said main matrix which fall within said submatrix.

According to another aspect of the invention, there is disclosed a system for digitizing and storing in memory in real time a video signal of successive images comprising means for converting an analog video signal to a digital signal; means for addressing said digital signal so that a matrix of addresses is formed, each address containing the digital value corresponding to the luminosity of each picture element; overall compression means for evaluating the luminosity value of a predetermined number of adjacent picture elements and generating a compression luminosity value to replace said predetermined number of elements; means for assigning an address to said compression luminosity value, whereby a new matrix compression value is created; and means for storing said new matrix in computer memory for later retrieval.

According to a further aspect of the invention, there is disclosed a system incorporating the elements of the above aspects.

There have thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other structures for carrying out the several purposes of the invention. It is important, therefore, that the claims be regarded as including such equivalent structures as do not depart from the spirit and scope of the invention.

BRIEF DESCRIPTION OF THE DRAWINGS

The specific embodiments of the invention have been chosen for purposes of illustration and description, and are shown in the accompanying forming a part of the specification wherein:

FIG. 6a is a schematic diagram of an analog to digital converter circuit;

FIG. 9 is a schematic diagram of the clock separator;

FIG. 10 is a schematic diagram of comparator logic 42;

FIG. 11 is a schematic circuit diagram of control circuitry generating X and Y ACTIVE signals;

FIG. 31 is a schematic diagram of the mode register;

DESCRIPTION OF THE PREFERRED EMBODIMENTS

Figure 1:
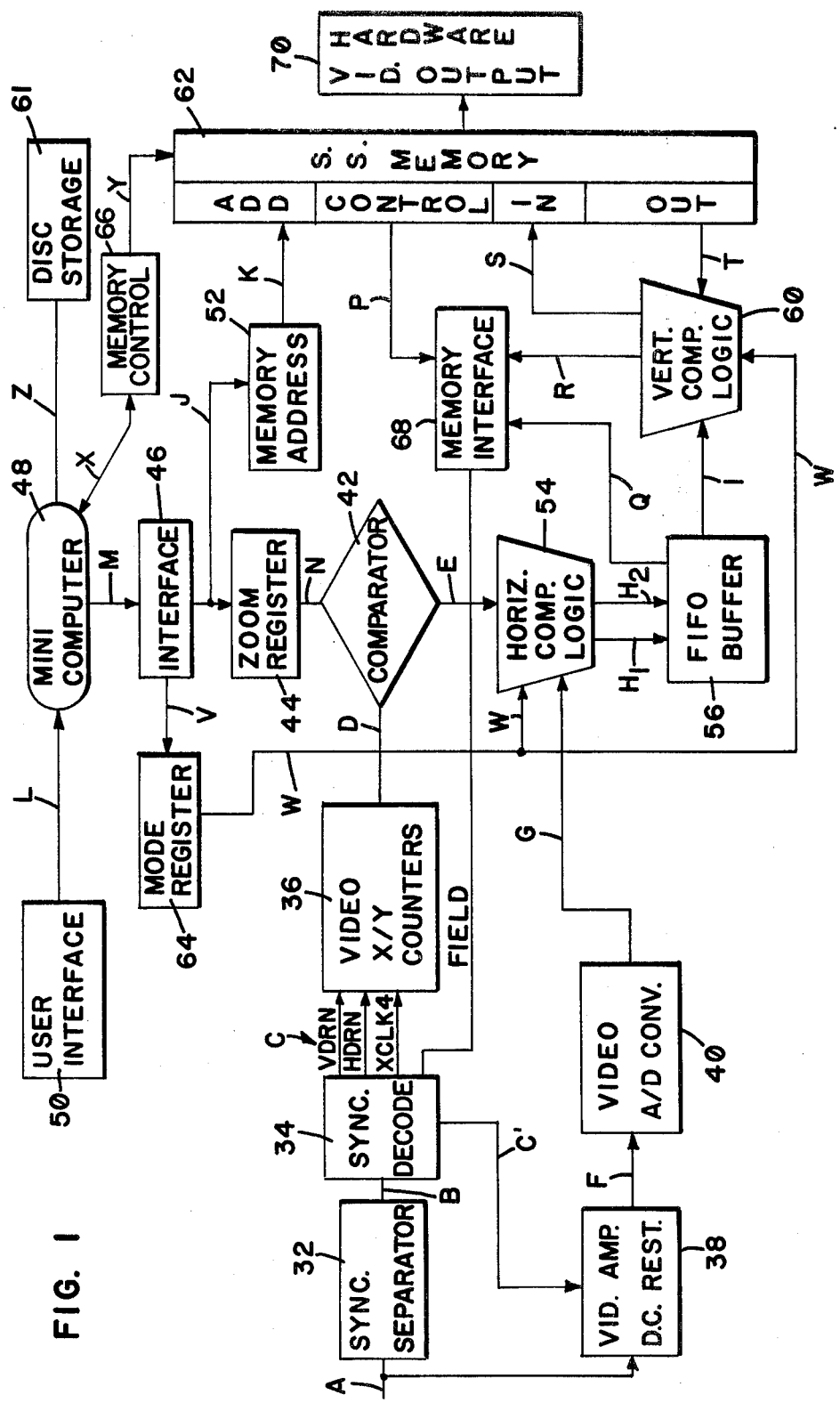
FIG. 1 is a block diagram representation of a video to digital converter according to the present invention.
Figure 2:
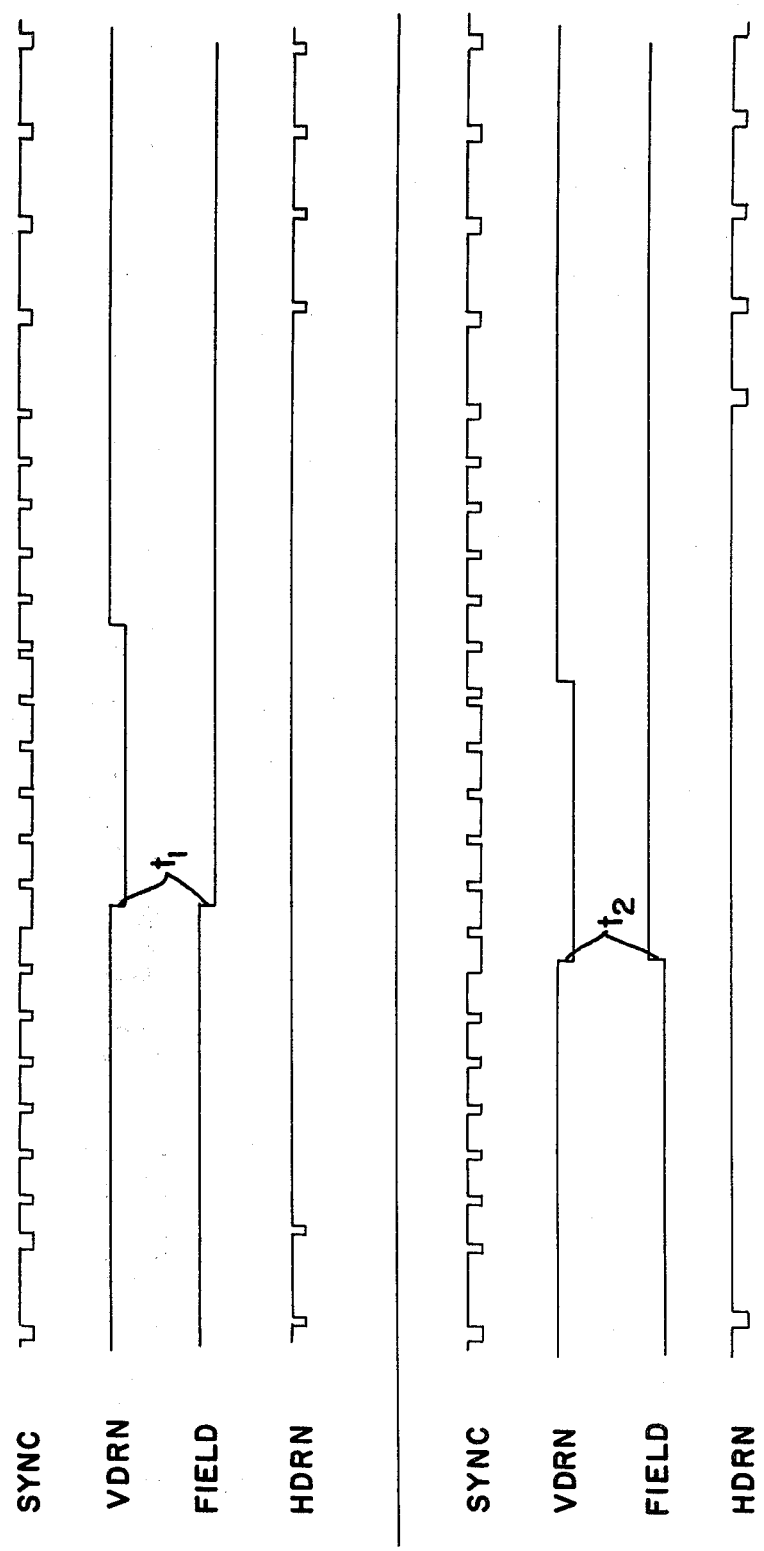
FIG. 2 is timing diagram of various signals generated from sync decoder 34.
Figure 6:
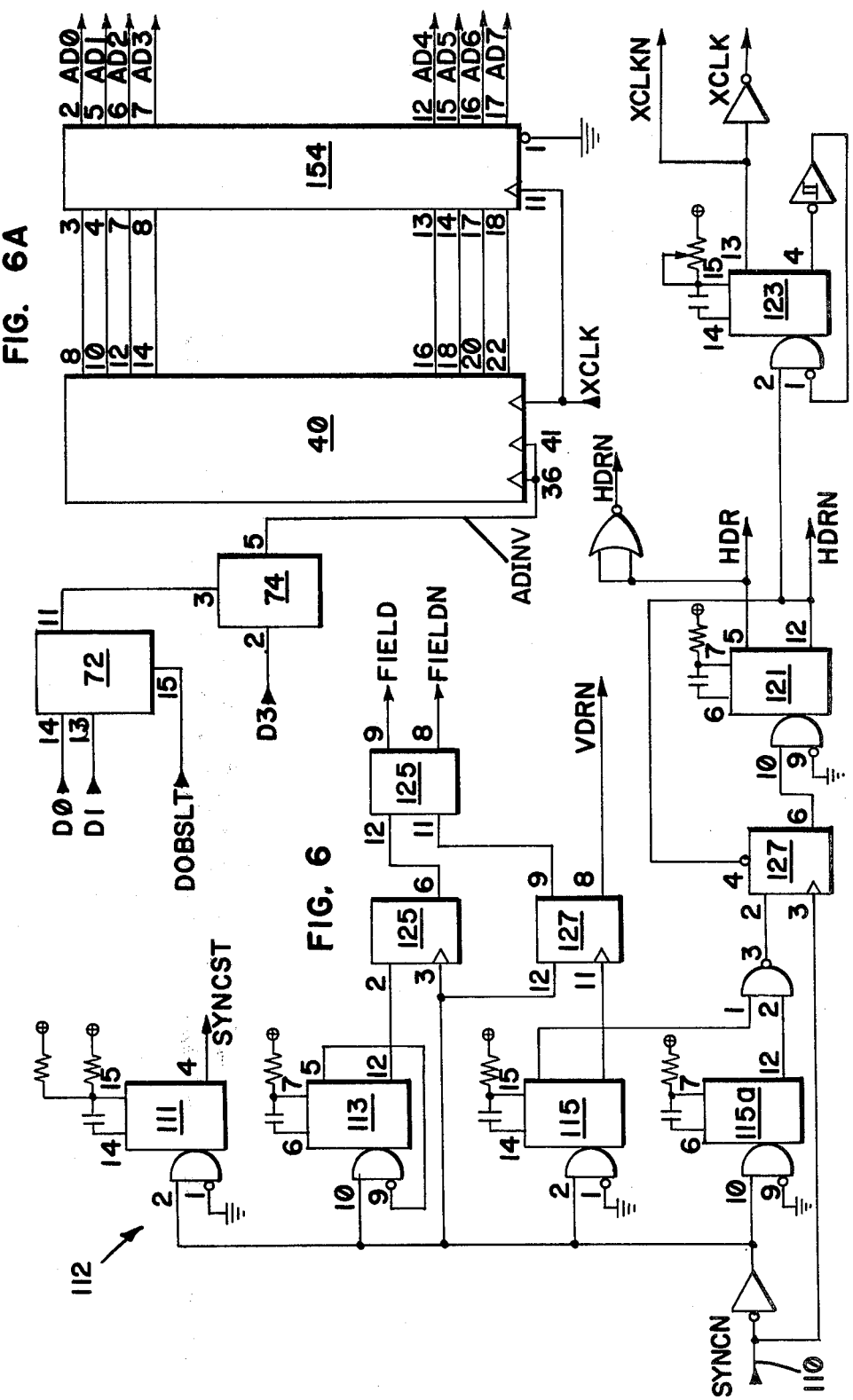
FIG. 6 is a schematic diagram of the sync decoder circuitry.

Referring to FIG. 1, there is diagrammatically shown a video to digital conversion system according to the preferred embodiment of the present invention. According to this system, a video signal is generated by an ultrasound scanner, television camera, or other device not shown capable of producing a raster scan. The video output A is supplied to a sync separator 32 and a video amplifier with a DC restorer 38. The sync separator 32 strips the synchronization signal from the raster scan for further processing. The video amplifier and DC restorer 38 amplifies the video signal and provides a negative DC bias to the video signal. The output B of sync separator 32 is applied to sync decoder 34. Decoder 34 generates four signals triggered by the sync signal B at output C. These four signals are represented in FIG. 2 of the drawings, wherein SYNCN, VDRN or vertical drive, HDRN or horizontal drive, and FIELD are shown plotted against time. (Note that SYNCN, VDRN, and HDRN are inverted signal equal to SYNC, HDR, and VDR.) FIG. 2 shows the relationship between these four signals just before and after the transition at time $t_1$ from an odd to an even field and around the transition at time $t_2$ from an even to an odd field. As indicated, the negative going VDRN pulse occurring at time $t_1$ and time $t_2$ corresponds to the beginning of a new field either odd or even. The negative going pulses representing the HDRN signal occur at the beginning of each horizontal sweep and are used, among other things, to synchronize the XCLK sample period generator as shown in FIG. 6. The XCLK4 signal has four possible phases, each offset by 80 ns, so that the video screen may be divided into 640 horizontal divisions, as will be explained hereinafter. The XCLK4 signal is based on the XCLK signal (not shown in FIG. 1) which has a 80 ns period.

Outputs VDRN, HDRN, and XCLK4 are applied to the video X-Y coordinate counters 36. The purpose of counters 36 is to define; a 640×480 main matrix on which we can define a submatrix or "window". The submatrix will comprise that portion of image which will be digitized and put into memory, while the remaining portions of the image are discarded so as not to fill the memory with unnecessary data. In the present embodiment, circuitry is provided to accomodate a maximum matrix size of 512×512 so that most of the 640×480 image of the video source will be applied to a matrix of that dimension. Typically, however, most of this matrix area is filled with irrelevant data which may be discarded. By "zooming in" on the relevant data, i.e., defining the submatrix, a large portion of memory can be saved for useful storage. Zoom position register 44 locates the window within the 640×480 matrix of particular interest. Because this reduced matrix can be projected on full screen by expansion manipulation, register 44 provides a zooming function somewhat the digital equivalent of an optical zoom lens. The user may select the submatrix desired within the main matrix by supplying information to the system through the user interaction hardware 50 (such as a console or joystick) which is interpreted by minicomputer 48 and interface 46 to have particular numerical values which are stored in register 44. The HDRN signal indicates that the horizontal sweep is beginning. The circuitry counts the horizontal lines until the horizontal line which falls within the desired submatrix area is reached. A comparator 42 indicates that this horizontal position has been reached and a Y-ACTIVE signal is generated indicating the uppermost Y coordinate of this desired matrix has been intersected.

The horizontal coordinate is obtained in essentially the same manner where the XCLK4 signal counts up from 0 to 160 (1 count for every 4 digitized pixels) during the unblanked portion of the screen in the positive X direction. When the counter reaches a value corresponding to the leftmost pixel within the desired matrix area, the comparator makes such a recognition of the intersection and produces a signal X-ACTIVE on line E in FIG. 1.

Figure 3:
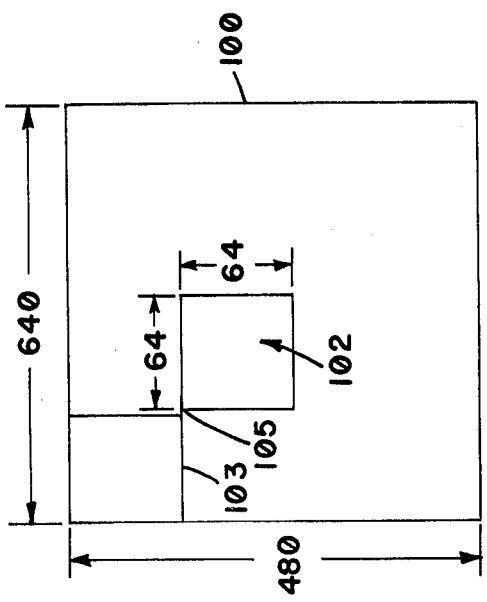
FIG. 3 is a representative drawing of a main and sub-matrix.

FIG. 3 of the drawings shows a main matrix 100 having 480 rows and 640 columns. Within matrix 100 is the submatrix of interest (i.e., window) 102 which in this case is 64 pixels across and 64 pixels down. Submatrix 102 is shown square; however, it may be some other rectilinear shape. Arrow 103 is shown to indicate the point at which comparator 42 would begin to produce an output Y-ACTIVE. Point 105 indicates the X coordinate position at which submatrix 102 would be intersected and an X-ACTIVE output would be generated. It must be understood that during some of the 525 (or 625 for some other television systems) sweeps across the video field, submatrix 102 will not be encountered and neither Y-ACTIVE nor X-ACTIVE outputs will be generated. Such is the circumstance above and below submatrix 102.

It may be desirable to compress the data within submatrix 102 into a still smaller matrix in order to provide more storage space for successive frames. This is particularly true where adjacent pixels do not differ greatly in luminosity.

Figure 4:
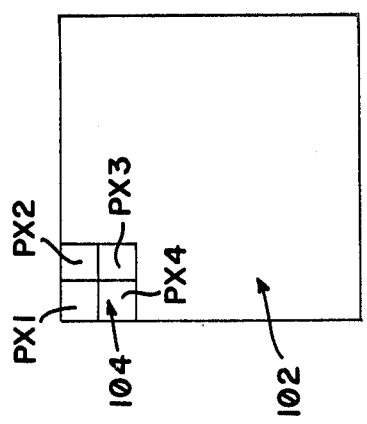
FIG. 4 is a representative drawing of the submatrix of FIG. 3 showing picture elements.

FIG. 4 illustrates the desired submatrix 102 enlarged in scale to show a 2×2 matrix 104 therewithin. Matrix 104 contains four pixels PX1-PX4. If the overall compression chosen is 4:1, matrix 104 will be compressed so that a single numerical output is produced corresponding to the luminosity of its individual pixels PX1-PX4. This embodiment provides circuitry capable of a 2:1, 3:1, or 4:1 compression in both the horizontal and vertical directions, resulting in the possibility of an overall compressions of 2:1, 3:1, 4:1, 6:1, 8:1, 9:1, 12:1, or 16:1.

The present invention provides circuitry for three possible compressions schemes. The first possibility may be called "SAMPLE" which simply takes one pixel, in this case PX1, and substitutes its value of luminosity for all pixels PX1-PX4 so that the compressed output is the same as PX1. An alternative to the "SAMPLE" scheme is the "MAX" scheme which finds the pixel of highest luminosity and substitutes that for the output which will replace all four pixels PX1-PX4. Finally, an "AVE" scheme may be employed wherein the luminosities of all pixels within matrix 104 are replaced by a single image element having a value approximately equal to the mathematical average of the pixels replaced.

In order to implement one of these compression schemes, it is necessary to determine the luminosity of each pixel. Output E (FIG. 1) from the comparator merely indicates the location of the desired matrix, whereas the brightness or luminosity of each pixel at the location corresponding to output E is digitized in the video analog to digital (A/D) converter 40 which receives an analog signal F from amplifier 38 and outputs it in the form of an eight-bit byte on line G to horizontal compression logic 54.

Horizontal compression logic 54 evaluates the relative level of brightness or luminosity between adjacent horizontal pixels and, depending upon the compression scheme used, provides an output of a particular digital value for luminosity.

Figure 5:
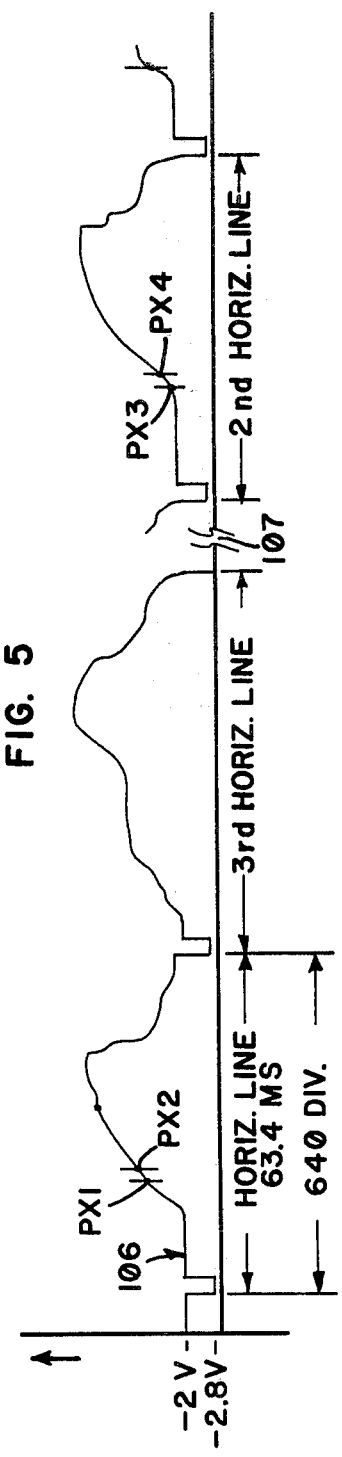
FIG. 5 is a representative trace of the analog video signal.

FIG. 5, which illustrates a typical analog trace 106 which would appear on line F (of FIG. 1) prior to digitization in the A/D convertor 40. The numerical value of digitized output G would have a similar trace; however, it would appear stepwise continuous. For convenience, we will use the analog output trace 106. Each horizontal line includes a −2.8 volt horizontal sync pulse and a −2.0 volt blanking segment. This period is indicated as one horizontal line. Under the American standard 525 line/30 frames per second RS-170 television system, this period of each line is roughly 63.4 microseconds. According to this embodiment, the unblanked portion of one horizontal line is divided up into 640 columns or divisions as indicated in FIG. 5. In the process of data compression on the horizontal line adjacent pixels are compared according to one of the three compression schemes explained above. Pixels PX1 and PX2 are marked on trace 106 to indicate the voltage level corresponding to luminosity for these two adjacent pixels on a horizontal line. Pixels PX3 and PX4 appear in the next field of the image (two interlaced fields per image). If compression is to take place whereby a 2×2 matrix such as matrix 104 in FIG. 4 is compressed into a single pixel, PX1 and PX2 must be analyzed. If the scheme for analysis is the "MAX" scheme, then the first pixel PX1 will be stored in a register and the second pixel PX2 will be compared with that value and will replace PX1 only if it has a higher luminosity. The result will be the final horizontally compressed pixel CX1.

In the "SAMPLE" scheme, pixel PX1 will simply be directed to the output of compression logic 54 as CX1. In the "AVE" scheme, the values of pixel PX1 and PX2 will be added in summing logic and shifted to produce an average voltage level or luminosity, expressed as compressed pixel CX1.

Vertical compression is somewhat different since pixels directly below each other are not immediately available for compression. The second horizontal sweep actually produces the third line on the screen, the second line being produced in the second field of the image. Therefore pixels PX3 and PX4 will not be available until the first 262.5 odd-numbered lines (in the 525 line system) have been displayed and the first even-numbered line is reached, i.e., line 2 of the image. FIG. 5 shows lines 1 and 3 followed by a break 107 in the time axis, and then line 2 in the second field. The "FIELD" (output C) (FIG. 1) indicates even or odd lines. Thus in the first line of the second field, pixels PX3 and PX4 are horizontally compressed in the same manner as PX1 and PX2, to produce a composite pixel CX2. CX1 may later be compressed with CX2. Memory is necessary for vertical compression because composite pixels CX1 and CX2 do not occur one after each other in time and therefore the intermediate values for the entire first field must be stored. Vertical compression employs the same schemes of SAMPLE, MAX, and AVE applied to horizontal compression to produce a single image element X1 to replace the previous four pixels PX1-PX4.

In addition to the capability to compress data contained within any given single frame, the present invention provides for compression of successive frames. This is known as temporal data compression and may be implemented using any one of the three algorithms aforementioned (i.e. SAMPLE, SUM, MAX). This technique is particularly valuable when the events being observed change slowly with respect to the frames per second rate. In these situations, two or more sequential frames may be combined with only a negligible loss of observeable data, or in some circumstances an enhancement of observeable data. Such an enhancement is often possible when averaging two or more successive frames, in that it tends to increase the signal to noise ratio. The other obvious advantage to temporal data compression is the increased utilization of the limited memory available.

A further capability of the present invention is image subtraction. Image subtraction is most useful in the field of digital radiography, where a reference X-ray is taken and later subtracted from X-rays of tissue injected with a contrast medium. This technique requires that the output of the digital radiography may be recorded on a video disk (for larger images because of memory speed limitations) and then input to the present invention one frame at a time so that an entire 512×512 image may be absorbed and operated upon. This subtraction capability is obtained by inversion of the analog to digital convertor outputs and by the add capability of the system.

The outputs H1 and H2 of compression logic 54 are eight-bit data channels. The information carried on H1 and H2 relates to the luminosity of two successive pixels after resultant horizontal compression. Two data channels, rather than a single channel, are used so that two bytes (one word) may be transferred in a parallel fashion and thus provide for faster data propagation.

Static Imaging

The memory 62 is capable of a throughput of 1.26 microseconds per work. Since a horizontal line has a period of 63.4 microseconds the memory 62 is capable of 50 words per line or 100 pixels (1 byte per pixel), the memory 62 can only accomodate 100 pixels when in realtime mode wherein successive picture fields (images) are to be stored. Thus, if a 512×512 matrix is desired (as in the case where no compression is used) it must be acquired by static imaging which divides the matrix into a plurality of narrower matrices. For convenience' sake, the circuitry has been designed to store only a maximum of 64 pixels rather than the possible 100 pixels, so that a 512×512 matrix will be made up of eight 64×512 matrices. When a composite of eight such matcrices is used together to produce a full 512×512 image, they are not synchronized with each other, making the matrices appear somewhat stepwise continuous. This limitation is peculiar to the preferred embodiment and could be eliminated with the addition of a faster memory if a larger picture field was desired by the user.

FIFO buffer 56 is designed to receive data at a high rate and pass it out to memory at a slower rate. The buffer can handle an entire line of 64 words in real time (i.e., at the digitization rate), and can thus absorb the burst of data on each horizontal line from horizontal compression logic before it is stored in the slower memory 62. The output of FIFO buffer 56 is applied to data channel I, in the form of a 16-bit word which is conducted through vertical data compression logic 60 to memory 62.

Vertical data compression logic 60 is connected to the memory 62 via data channels S and T which carry 16 bits or one word each. Data channel S is an input to the memory which allows storage of information. Channel S is used to store the first values such as pixels CX1 and then later accumulate it with CX2 using also data channel T. After accumulation the value stored will be image element X1.

Memory control interface 68 is logic circuitry which ensures that data channel S puts data into the memory 62 in combination with an address established on data channel K from the memory address register 52.

The minicomputer 48 through interface 46 instructs the memory address register 52 via data channels M and J, where the first address of each field will be. The memory address register will supply the remaining address for the field by means of internal counters. Each image element will be assigned an address having an X and Y coordinate. The size of the matrix (i.e., 512×512, 128×128, etc.) will determine the sequence of memory addresses assigned.

In the preferred embodiment the minicomputer is a NOVA, manufactured by Data General. Hereinafter, all standard back panel inputs and outputs of the NOVA will be referenced accordingly, with the following exceptions. "DATA" and "DAT" shall be abbreviated to "D", "OUT" shall be abbreviated to "O", and "bar" or inverted signals shall be denoted by adding an "N" to the signal acronym. The corresponding connections to the back panel connectors may be determined by referral to the NOVA Cookbook 015-000009-09 App A Programmer's Reference, published by Data General Corporation, Southboro, Massachusetts.

Mode register 64 receives information from interface 46 on data channel V. The mode register 64 produces outputs necessary to select the proper compression scheme and perform other functions. These outputs are supplied via data channel W to horizontal data compression logic 54 and vertical data compression logic 60.

Disc storage 61 is connected to minicomputer 48 through data bus Z. Through data channels X and Y and memory control circuit 66, data may be transferred from memory 62 to minicomputer 48 for transmission through bus Z to disc storage 61.

Although not shown in detail in this application, memory 62 is controlled by minicomputer 48 through the standard $A^2$ memory interface 66, which is manufactured by Medical Data Systems, Ann Arbor, Michigan, and the corresponding data channels X and Y (FIG. 1). Similarly, the interface between the Nova minicomputer 48 and the disc storage 61 is available from Data General as standard equipment and so it, too, is not shown in detail. However, with this equipment, data may be transferred from the $A^2$ memory into a disc storage system for permanent record.

CIRCUIT INTERCONNECTION OVERVIEW

The individual blocks in FIG. 1 are interconnected by numerous data and control lines. To aid in analysis of the specific circuits shown in FIGS. 6–31, an overview of the interrelation of the blocks is appropriate. FIGS. 22, 23, 28, 29, and 31 comprise most of the control circuitry interfacing the minicomputer 48, memory 62, and memory interface 68 to the balance of the system. The circuitry shown in FIGS. 6–11 performs two main functions: (1) synchronization timing for the digitizing logic, and (2) activating the digitizing logic at the appropriate time during each screen image. As a whole, the curcuitry shown in FIGS. 13, 14, 16, and 17 performs the horizontal compression on digitized luminosity values output from the analog to digital converter. Vertical compression is performed by the circuitry shown in FIGS. 18, 20, and 21. The circuitry shown in FIGS. 19, 24, 25, 26, and 27 provides the addressing for pixel data stored in memory 62.

Circuitry

Looking at the circuitry of the individual blocks shown in FIG. 1 in greater detail, attention is directed to FIGS. 6–31. It is noted that the alphaacronyms for various signals appearing in the circuitry may have a last letter "N". This indicates a corresponding signal having inverted levels and the same base acronym (without the "N" code added) is also used in the circuitry. (Example: HDRN=HDR inverted.) Sync separation and decoding is done by known means using a TBA 950-2 sync separator manufactured by National Semiconductor. Video amplification and DC restoration shown in block 38 is accomplished by the use of a TBA 970 video amplifier and DC restoration chip.

Sync decoder 34 is shown in detail in FIG. 6. The sync signal 110 is input to circuit 112 to produce the outputs FIELD, HDRN, and VDRN. The various signals are derived from the logic, the retriggerable one-shots 111, 113, 115, and 115a and the Schmitt-Trigger one-shots 121 and 123. The periods of the one-shots are determined by the R-C networks connected to each. FIG. 2 of the drawing shows a comparative trace of these signals.

Figure 23:
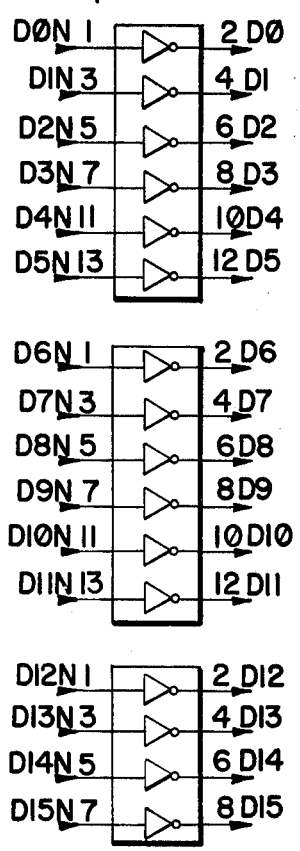
FIG. 23 is a schematic diagram of an inverting buffer.
Figure 28:
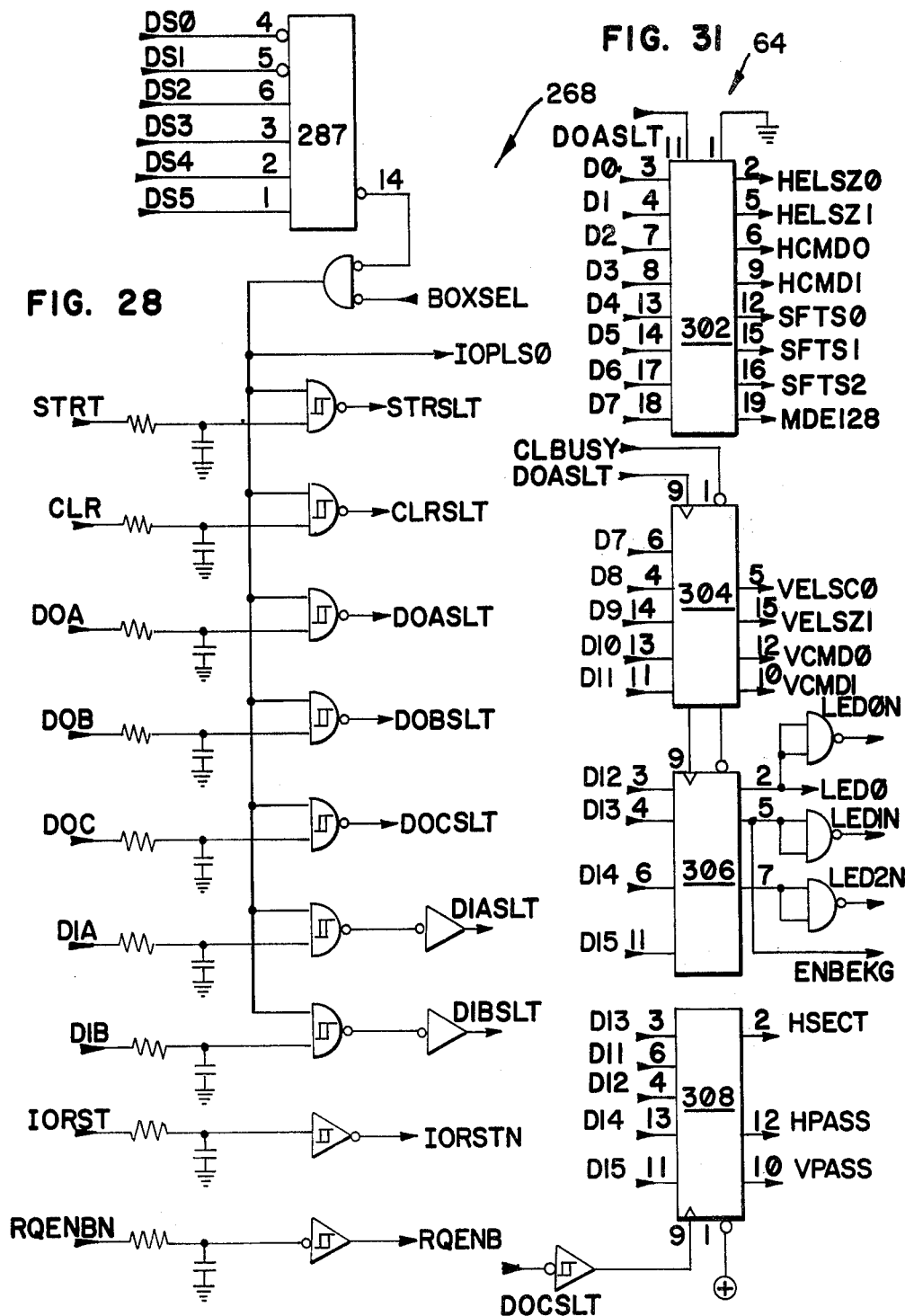
FIG. 28 is a schematic diagram of control circuitry.

FIG. 6A shows the A/D converter circuit 153. Circuit 153 produces the digitized pixel luminosity for input to the horizontal compression 152 in FIG. 14. Analog to digital converter 40 converts the analog luminosity signal into a digital code with a sample time controlled by the XCLK signal applied thereto. The outputs of A/D converter 40 may be inverted through the input ADINV, which is controlled by the inputs to circuits 72 and 74. The D0, D1, D3, and DOBSLT inputs to circuits 72 and 74 are derived from standard minicomputer outputs (FIG. 23 and FIG. 28). D register 154 statisizes the output of analog to digital converter 40. The output of D register 154 is an 8-bit digital code having a sample period determined be the frequency of the XCLK signal.

ZOOM FUNCTION

Figure 7:
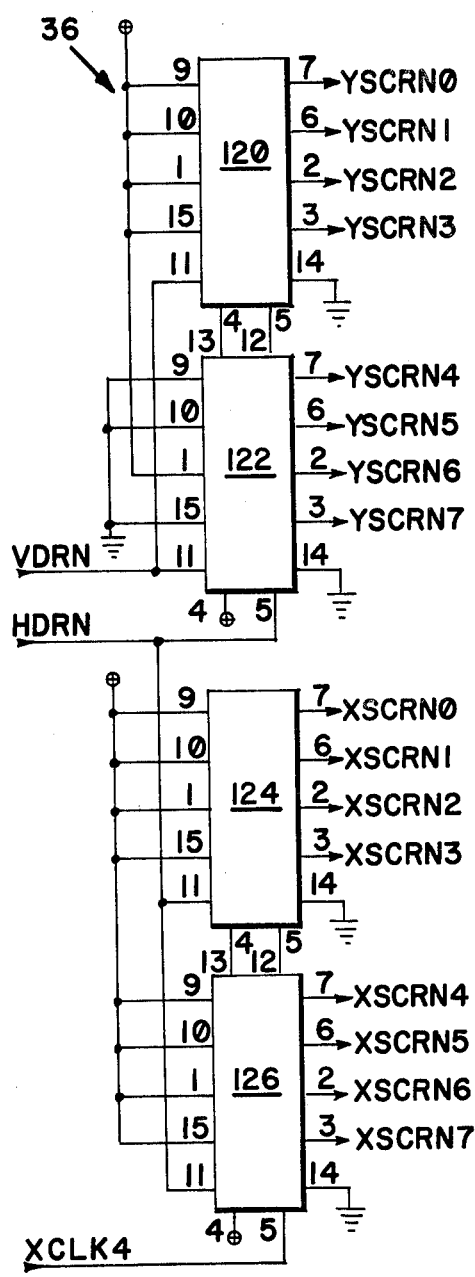
FIG. 7 is a schematic diagram of the X/Y coordinate counters.

Shown in FIG. 7 is X/Y coordinate counter circuitry 36 which includes four counters 120, 122, 124, and 126. Counters 124 and 126 are reset to zero by the HDRN signal indicating the beginning of the horizontal sweep. They are incremented by the XCLK4 signal (see FIG. 9), producing an eight-bit code corresponding to the X coordinate location on the screen. Counters 120 and 122 are reset by the presence of the VDRN signal indicating the beginning of a new field and are incremented by signal HDRN, which appears at the beginning of each new horizontal line. Thus, the outputs of counters 124 and 126 which are XSCRN 0-7, provide the X coordinates across the screen, while counters 121-122 having outputs YSCRN 0-7 provide the Y coordinates for each pixel.

Figure 8:
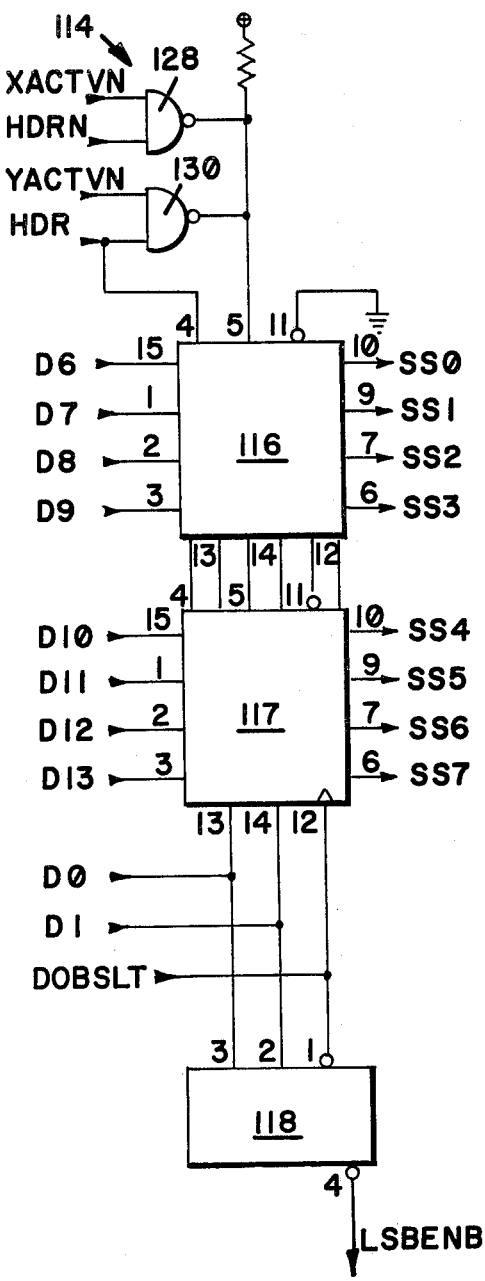
FIG. 8 is a schematic diagram of the STOP/START coordinate register.

The principal function of circuitry 114 as shown in FIG. 8 is to provide the start and stop coordinates to the start/stop detection circuitry 42 (FIG. 10) as will be later described. The 4×4 register files 116 and 117 are used to store the XSTART, XSTOP, YSTART, and YSTOP coordinates input from the minicomputer through data lines D6 through D13. Minicomputer data lines D0 and D1 are used to address (i.e., position) the start/stop coordinates in the register files. The start/stop coordinates are written into the register files once at the outset of each field. During the digitizing process, the start/stop coordinates are output through the SS0-SS7 lines in response to the XACTVN (FIG. 11), HDRN, YACTVN (FIG. 11), and HDR signals applied to register files 116, 117, and gates 128 and 130. Input line DOBSLT, which like DOASLT and DOCSLT is derived from the corresponding minicomputer outputs DOA, DOB, and DOC (see FIG. 28), is used as a write enable line during the write process from the minicomputer to the register files. Demultiplexer 118 allows DOBSLT to also be used as a latch enable for flip-flops 119 D14 and D15 inputs (circuit 132, shown in FIG. 9).

FIG. 9 shows circuit 132 which includes a four-phase clock separator 135 which divides the XCLK input into four phases, outputting one of the four phases in response to the signals input from the minicomputer on lines D14 and D15. Before the digitizing process begins, the D14 and D15 inputs are latched into circuit 119 (a quad flip-flop). As mentioned above, the enable or latch input (LSBENB) to circuit 119 originates in the demultiplexor 118 of FIG. 8. Output XCLK4 is used to increment counters 36 in FIG. 7 and synchronize data compression circuitry. The four-phase clock system allows fine adjustments of the horizontal screen start-stop coordinate while keeping the horizontal comparison freuency low enough to allow the start-stop detection circuitry of FIGS. 10 and 11 time to respond. In essence, the fourphase clock system allows the start-stop detection circuitry (which determines the intersection of the main and submatrices) to ignore all but every fourth horizontal screen coordinate during each horizontal sweep. The selection of the correct clock phase is performed by software in the minicomputer. The selection of clock phase allows for exact selection of the left-most coordinate of the intersection set; however, the right-most coordinate has to be a multiple of the clock phase, so the user's selection of submatrix coordinates may have to be approximated in some cases.

Another function for circuit 119 is storing memory 62 addressing information from the minicomputer outputs D11 and D12 (inverted from D11N and D12N). The information is latched into circuit 119 in response to the input line DOCSLT. The outputs of circuit 119 are N3250, 32N50, and FSTRT. FSTRT. FIELD, and BUSY are input to logic circuitry 133. The output of circuitry 133, BUSYF is input to circuit 144 of FIG. 11.

FIG. 10 shows the comparator logic 42 which includes multiplexors 134 and 136 and comparators 138 and 140. Multiplexors 134 and 136 receive the current coordinates XSCRN 0-7 (X coordinates) and YSCRN 0-7 (Y coordinates), the coordinates of the current pixel location which has been digitized, from the X/Y coordinate counters of circuitry 36 in FIG. 7. The multiplexor passes the X coordinates at all times except during the active period of the HDR-input, which is a pulse at the outset of each horizontal sweep. The outputs of multiplexors 134 and 136 are applied to comparators 138 and 140 along with the start/stop coordinates SS0-SS7 from circuitry 114 of FIG. 8. The outputs SS0-SS7 of circuitry 114 are synchronized for comparison with the current X/Y coordinate inputs YSCRN-0-7 and XSCRN0-7 with the common HDRN input signal. The proper start/stop coordinates are output from circuit 114 in response to the signals XACTV, YACTV, HDRN, and HDR. The signals XACTV and YACTV are produced by the circuitry 144 shown in FIG. 11, as will be explained hereinafter. Whenever the current screen coordinates equal the start/stop coordinates an AEQB output 142 is generated indicating a point of intersection between the edge of the submatrix and the current location of the pixel screen coordinates.

AEQB output 142 is applied to circuit 144 as shown in FIG. 11, producing, in cooperation with the other inputs, the XACTV, XACTVN, YACTV, and YACTVN outputs. The YACTV output is latched whenever AEQB output 142 of circuit 42 coincides with the HDRN signal (i.e. the pulse at the beginning of each horizontal sweep). The YACTV output remains latched until the AEQB output 142 goes low and then high again during HDRN pulse periods. The YACTVE output can also be unlatched with a BUSYF or VDRN signal level applied to the respective flip-flops 143 and 145. During the time the YACTV output is latched, flip-flop 147 becomes enabled. An output 151 from flip-flop 147 will then be generated each time an AEQB output 142 is present during the XCLK4 strobe period. The output 151 from flip-flop 147 is input to flip-flop 149 to produce an XACTV and XACTVN output. The XACTV output is unlatched similarly to the YACTV output, or when the HDRN and YACTV signals coincide.

Figure 12:
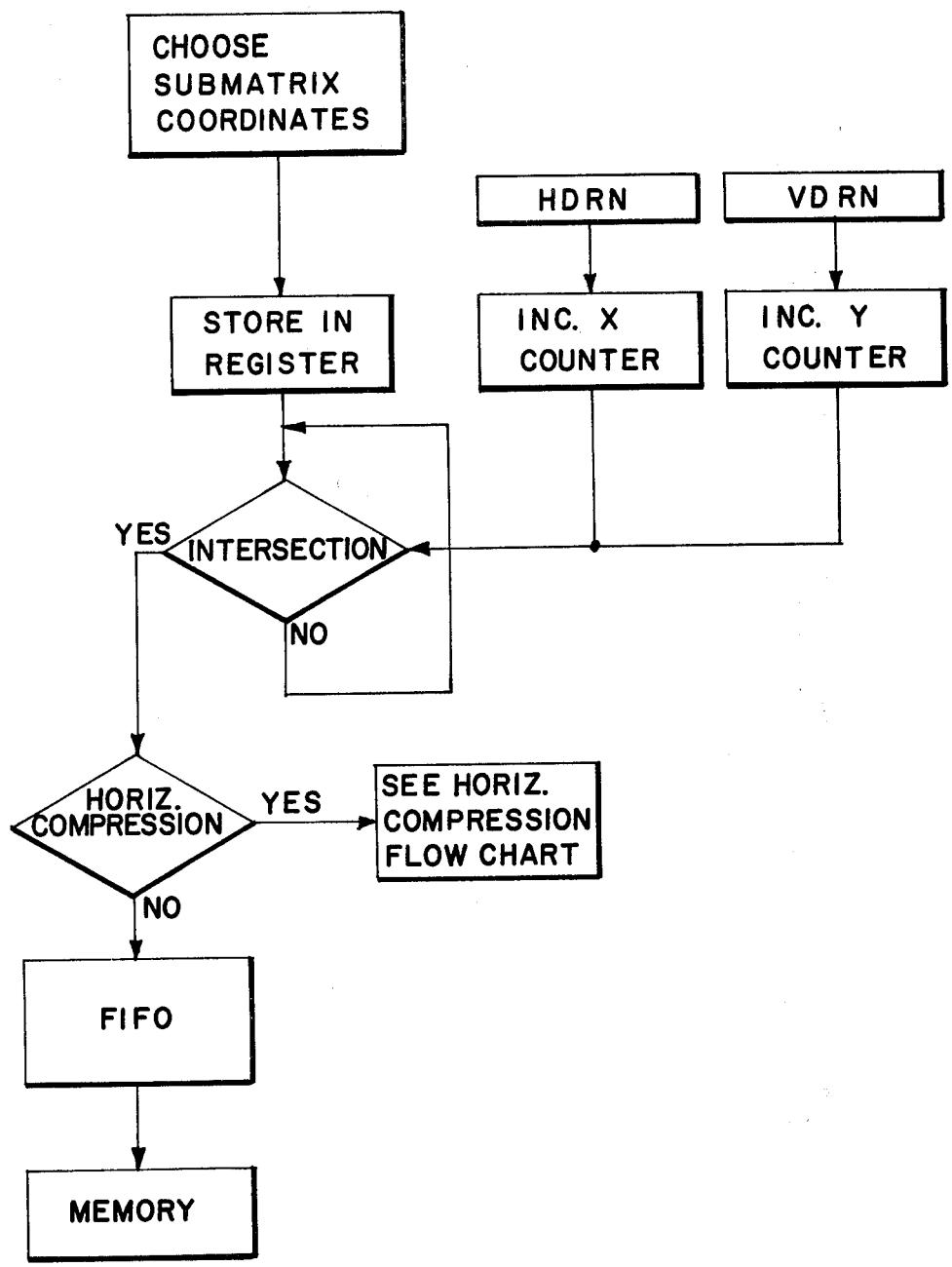
FIG. 12 is a flow graph illustrating operation of the ZOOM feature.

The function of the ZOOM position register 44 and comparator 42 is shown in the Flow Graph in FIG. 12. Submatrix coordinates are generated by the minicomputer 48 and are stored in ZOOM position register 44 through interface 46. X/Y coordinate counters 36 generating current matrix locations in response to HDRN, VDRN, and XCLK4 signals. These signals cause incrementation and periodic resetting of the X and Y counters. Comparator 42 determines whether the coordinates in a submatrix match with the current location, and if so produce which is applied to the compression logic 54. If no compression is to be performed the digitized data is stored directly in memory 62 through FIFO buffer 56. Horizontal compression will be explained hereinafter on a separate flow chart.

Spacial Data Compression

Figure 13:
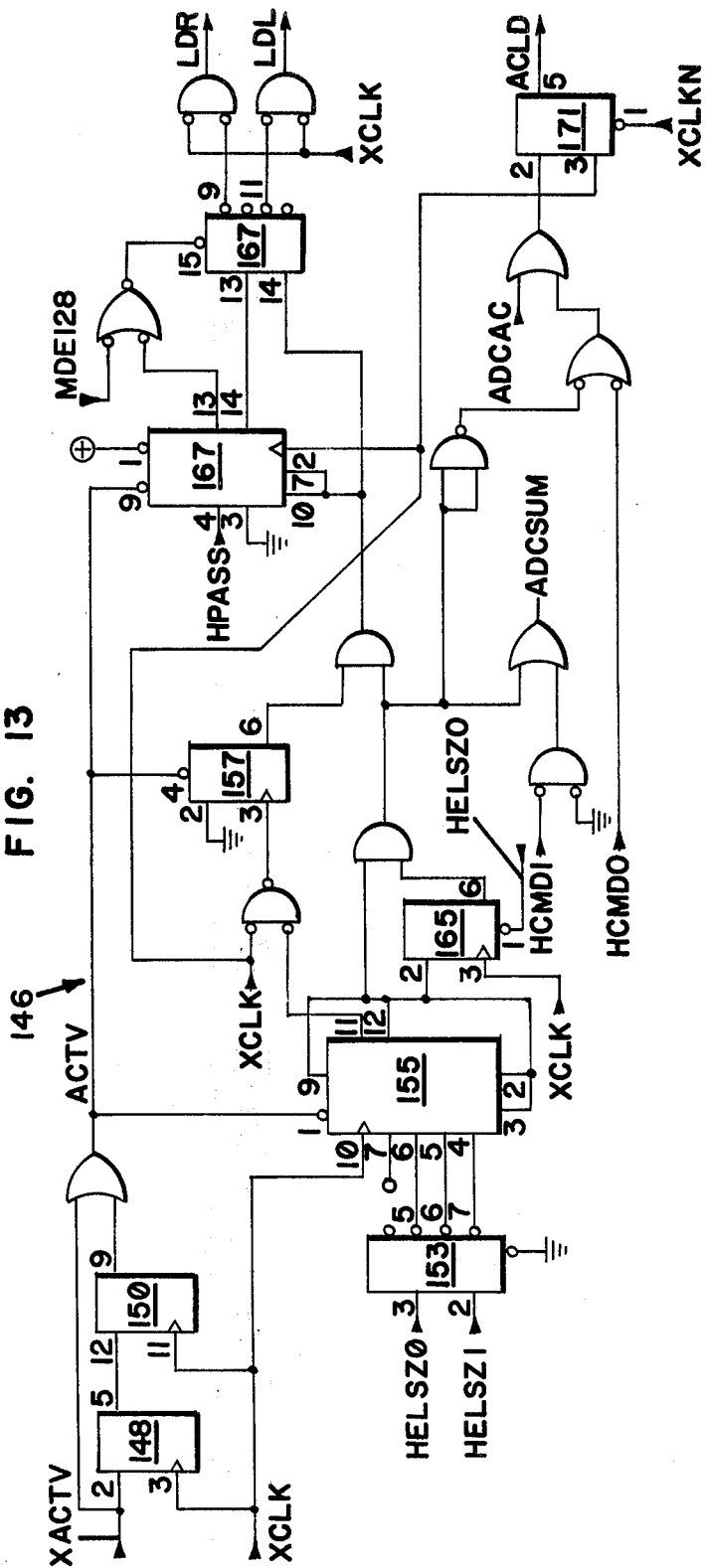
FIG. 13 is a schematic diagram of the horizontal compression logic timing.

FIG. 13 shows the horizontal compression logic/timing. The timing is activated by the XACTV line generated by circuit 114 (as shown in FIG. 11) and synchronized by the XCLK signal. The logic timing has five static input lines partially controlling the outputs LDR, LDL, ACLD, and ADCSUM. The static lines HELSZ$\emptyset$ and HELSZ1 control the logic timing with respect to the horizontal resolution element size (i.e. degree of compression). The HCMD$\emptyset$ and HCMD1 control the timing with respect to the horizontal compression mode (i.e., SAMPLE, MAX, or AVE). The other inputs to circuit 146 are the HPASS, MDE128, and the ADCAC signals. Inputs HELSZ0, HELSZ1, HCMD$\emptyset$, HCMD1, and MDE128 originate in the mode register circuitry 64, which will be further discussed hereinafter, shown in FIG. 31.

Figure 14:
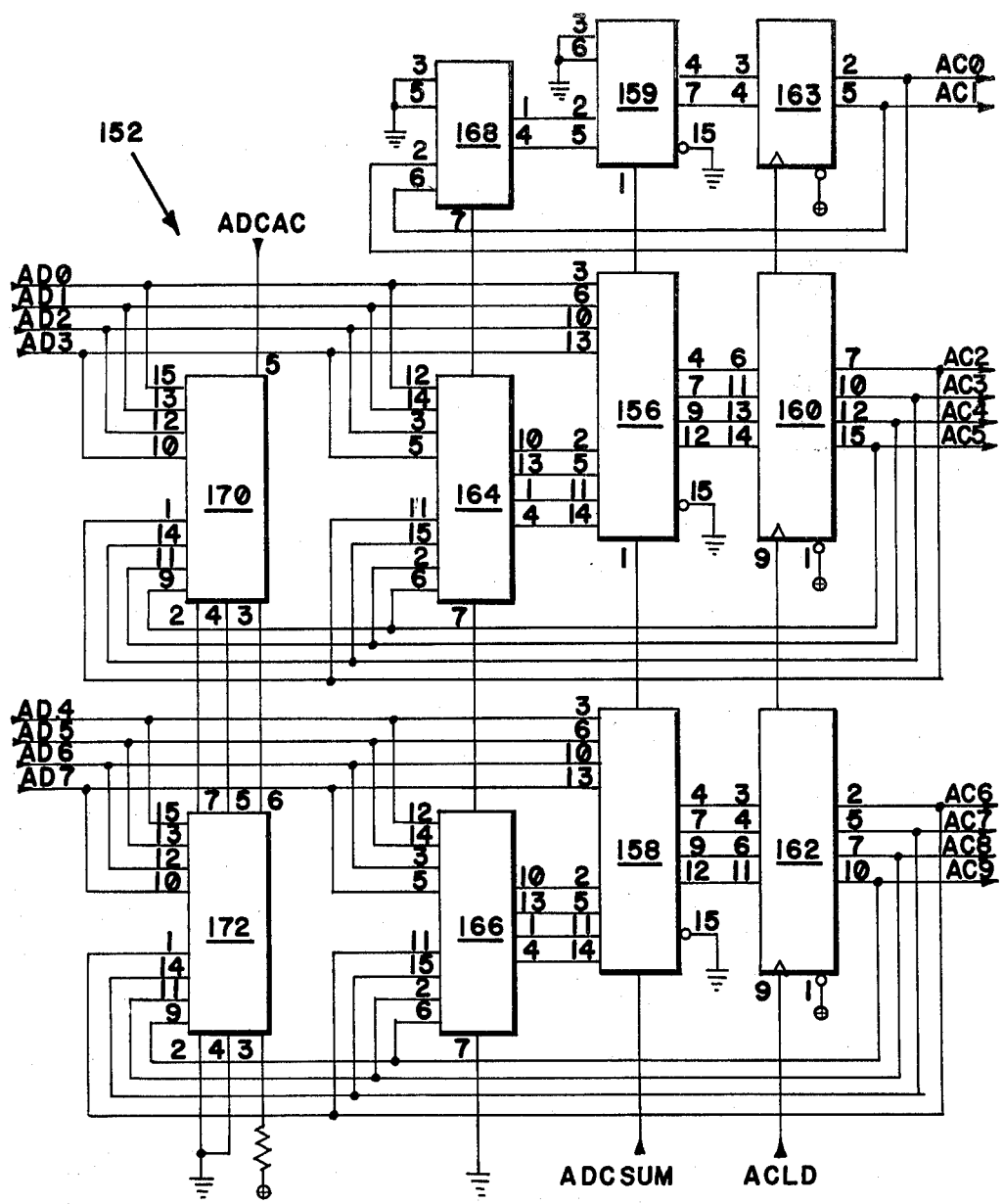
FIG. 14 is a schematic diagram of the horizontal compression logic.

FIG. 14 shows the horizontal compression logic. The horizontal compression circuit 152 receives the 8-bit digital code from D register 154 (FIG. 6A) along with the signals from control lines ADCSUM and ACLD, which are generated by the horizontal compression logic/timing circuit 146 of FIG. 13.

In the "SAMPLE" mode of operation, the digitized code from D register 154 is fed through multiplexors 156 and 158 into the D registers 160 and 162. When an ACLD signal is applied to D registers 160 and 162, the data present on their inputs is latched on the output lines AC2-AC9 (for eventual storage in memory 61). For the "SAMPLE" mode, the ACLD signal is generated by circuit 146 as shown in FIG. 13 according to the resolution element size or compression ratio. If, for example, a 4×4 resolution element size is selected (i.e., a 16:1 compression ratio), the ACLD signal will appear only once for every four digitized values appearing at the output of D register 154.

The "MAX" horizontal compression mode requires an additional level of computation, which is provided by 4 bit comparators 170 and 172. Data storage is accomplished by registers 160 and 162, which provide the "memory" when necessary comparing horizontally adjacent pixels from D register 154 (FIG. 6A). Taking a "MAX" compression of a 2×2 resolution element size, for example, the first pixel is passed through multiplexors 156 and 158 (controlled by the ADCSUM output from circuit 146) into D registers 160 and 162 respectively. These values are loaded into the registers 160-162 in response to an ACLD signal appearing on outputs AC2-AC9. During the next XCLK sample period, the right hand adjacent pixel becomes present on the output of register 154 and the "upper" eight inputs to 4 bit comparators 170 and 172. The previous or last pixel value is simultaneously input to the "lower" eight inputs of comparators 170 and 172 from the outputs of registers 160 and 162. If the most recent pixel luminosity value present on the "upper " eight inputs of the comparators is greater than the luminosity value present on the "lower" eight inputs of registers 160 and 162, then output ADCAC will appear. The ADCAC signal is then applied back to the corresponding input of circuit 146, resulting in an ACLD signal to registers 161 and 162 of circuit 152. Thereby, the greatest or "MAX" digitized pixel luminosity value is present on the lines AC2-AC9 at the end of each comparison cycle. Because the lower, vertically adjacent, "MAX" pixel luminosity value will not be available for comparison by vertical compression logic 60 (shown in FIGS. 20 and 21) until the next horizontal field, the data present on the outputs of registers 160 and 162 appearing on AC-2-AC9 must be stored for later retrevial by it. Memory 62 is utilized for this purpose. When the vertically adjacent lower horizontal pixels are available on the next horizontal field, the maximum luminosity value for the larger of the two is likewise and inputted to the vertical compression logic 60. The vertical compression logic 60 then retrieves the appropriate stored maximum pixel luminosity value from the previous field and compare it to the one presently output by the horizontal compression logic circuit 162. The vertical data compression logic will be further explained hereinafter.

Figure 16:
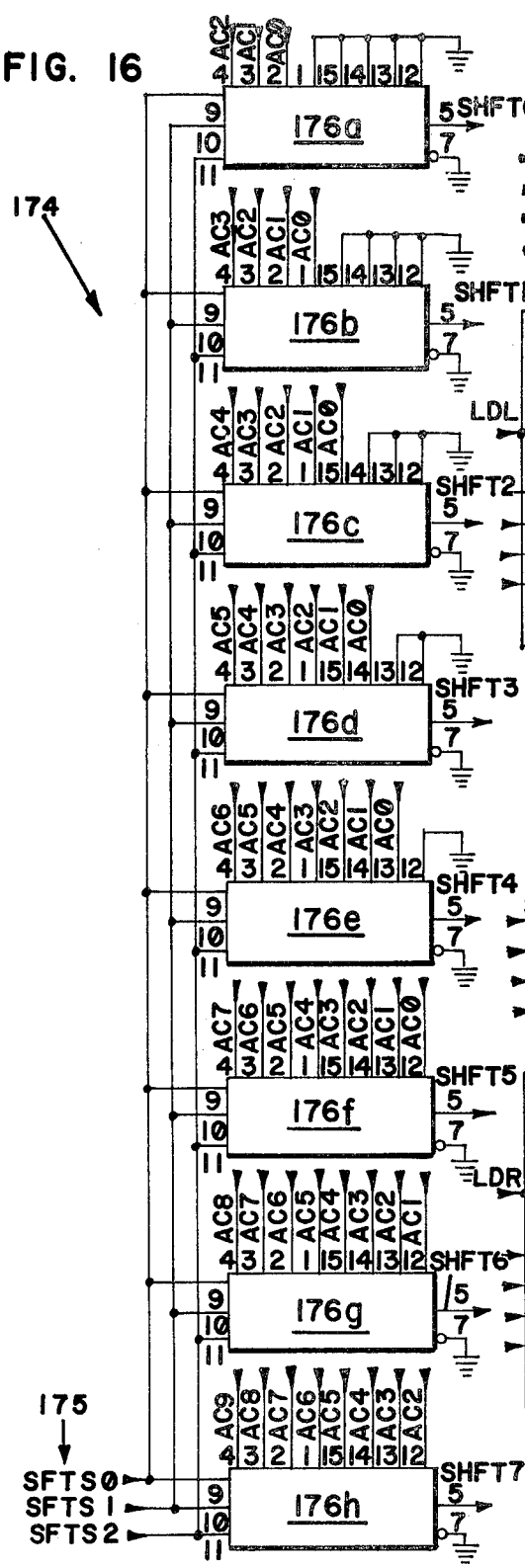
FIG. 16 is a schematic diagram of shift register circuitry in the horizontal compression logic.

The "AVE" compression mode of circuit 152 requires the additional circuits 168, 159, and 163. These circuits are necessary because additional bits are required to handle the overflow resulting from addition. Using a technique similar to that in the "MAX" mode, horizontal compression circuit 152 stores the first of successive digitized pixel liminosity values in registers 160 and 162. The adding process then takes place in summers 164 and 166, the sum is then passed through multiplexors 156, 158, and 159 to the registers 160, 162 and 163. The number of successive additions required before the sum is divided by circuit 174 (FIG. 16) is dictated by the resolution element size. As in the other two compression schemes, the control logic is supplied by horizontal compression logic/timing circuit 146 (shown in FIG. 13). As would be expected, the sum present at the outputs of registers 161, 162, and 163 on lines AC$\emptyset$-AC9 must be divided by the appropriate power of 2 before storage in memory 62 or input to vertical compression logic 60. The dividing process is performed by shift multiplexor circuit 174 as shown in FIG. 16. Eight 8:1 multiplexors 176a-h perform the function of a high-speed shift register. In a two-by-two resolution element size (4:1 overall compression), the sum present on the outputs of horizontal compression circuit 152 (outputs AC$\emptyset$-AC9) is divided by four. Later addition of another set of averaged pixels by the vertical compression logic 60 (shown in FIG. M) results in the correct average for the entire 2×2 block. An appropriate shift select code applied to inputs 175 (SFTS$\emptyset$-SFTS2) will produce this two place divide by four shift, the resulting value then present on outputs SHFT$\emptyset$-SHFT7. In a similar fashion, a 4×4 resolution element size would require a divide by sixteen in the shift multiplexor circuit 174, which would be accomplished by a four place shift. Because a divide by three function is not possible to perform giving the time constraints of the system, a divide by sixteen is performed on the nine summed values, resulting in something less than a true average. When a shift is not necessary, as would be the case in the "MAX" or "SAMPLE" mode, an appropriate input to shift select inputs 175 will result in a no-shift condition, passing the outputs from circuit 152 to AC2-AC9 directly through the shift multiplexor circuit 174.

Figure 15:
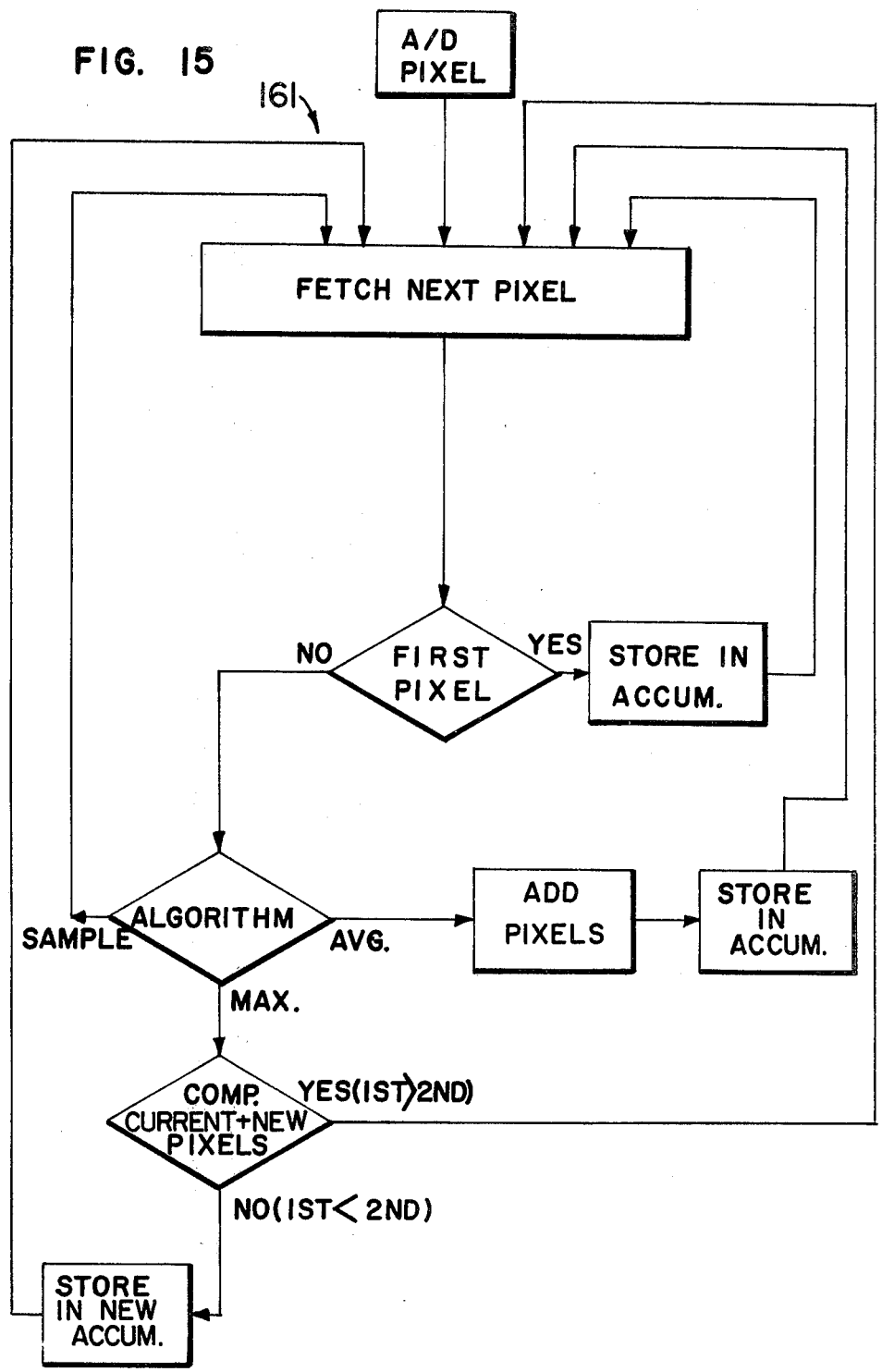
FIG. 15 is a flow graph of the operation of the horizontal compression logic.

FIG. 15 shows a flow graph 161 illustrating a 2:1 horizontal compression. Analog to digital converter 40 outputs an eight-bit pixel which is fetched by the horizontal compression logic 54. If this is the first in a series of pixels it is stored in the accumulator and the next pixel is immediately acquired. After this second pixel is acquired it is operated on or ignored depending on which algorithm has been selected. When in the "SAMPLE" mode, this second pixel is always ignored. When in the "AVE" mode the first pixel stored in accumulators 160 and 162 is added to this second pixel, divided (as will be explained later), and stored in the accumulator (and later in memory 62) for subsequent retrieval. When in the "MAX" mode the first and second pixels are compared and stored in the accumulator according to which one is greater. Values stored in the accumulator are then stored in memory 62 or operated on again, according to the mode of operation selected.

Figure 17:
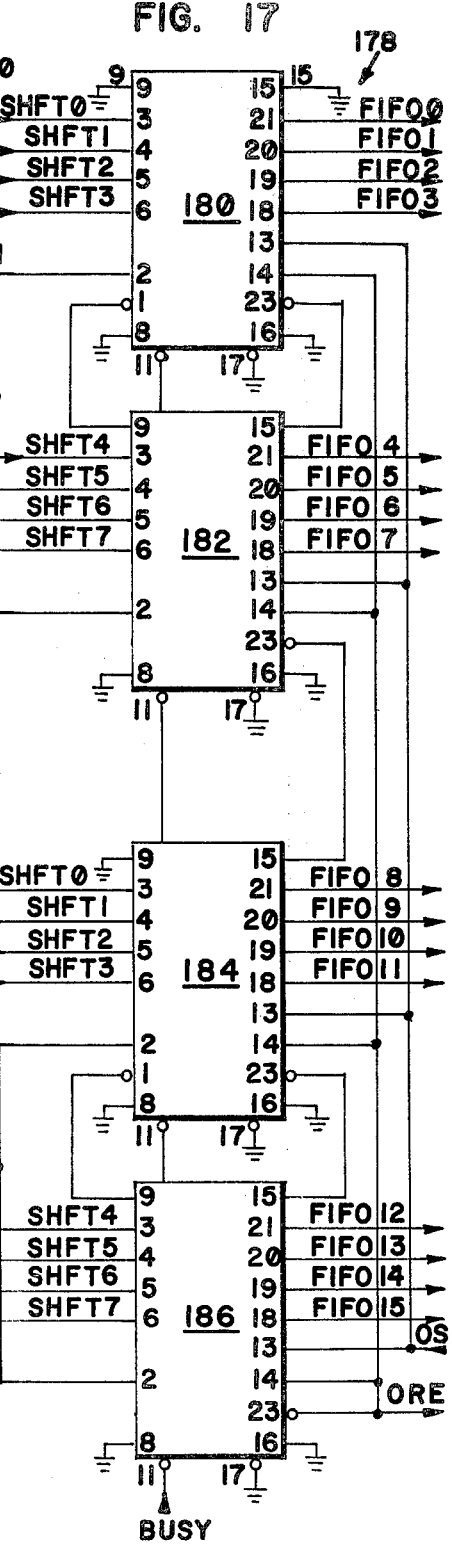
FIG. 17 is a schematic diagram of the FIFO buffer 56 shown in FIG. 1.

FIG. 17 shows circuit 178 which performs the function of FIFO buffer block 56 as shown in FIG. 1. Circuit 178 functions to align two successive eight-bit serial outputs from circuit 174 into one sixteen-bit word for use by vertical compression logic 60 or storage in memory 62. The FIFO buffer circuit 178 includes four expandible fall-through FIFO buffer chips having a capacity of 64×4 bits and are the type 67401 manufactured by Monolithic Memories of Sunnyvale, California. A two-byte (16-bit) output is chosen to speed data transfer to memory 62. However, it is possible to use eight-bit bytes if the memory chosen was fast enough. The inputs to the buffers SHFT∅-7 are hardwired to both pairs of buffers 180-182 and 184-186. The outputs of the buffers are denoted FIFO∅-15 and therefore constitute a 16-bit word having two pixel values in series for each word. Inputs SHFT∅-7 (one 8-bit byte) are alternately clocked into FIFO buffers 180-186 in a serial fashion in response to alternating LDL and LDR signals, then clocked out as a 2-byte 16-bit word in response to the OS signal (output from circuit 256 of FIG. 27). The data clocked into the FIFO buffers is thereafter asynchronously transferred to the FIFO outputs FIFO∅-15. When a signal appears at the ORE output (output ready), valid data is present at the outputs FIFO∅-15. The data is then clocked into the memory or used by vertical compression logic 60, as will be explained hereinafter. According to the preferred embodiment, an image width of 100 pixels is the maximum allowed for given the data transfer rate of memory 62; however, this maximum width may be increased by substituting a faster memory.

Figures 18, 19:
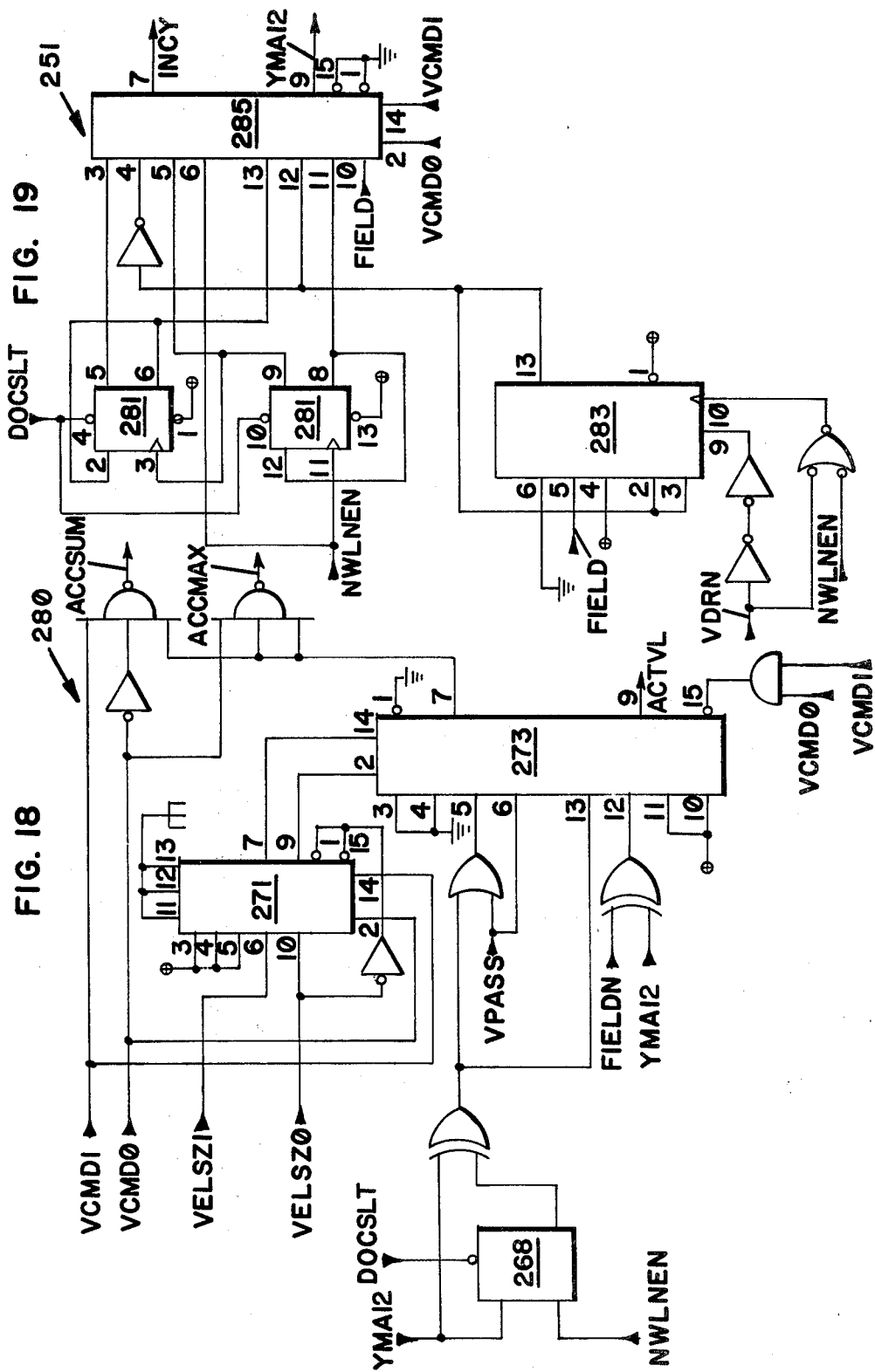
FIG. 18 is a schematic diagram of the vertical data compression logic timing shown as block 60 in FIG. 1.
FIG. 19 is a schematic diagram of the Y-Address control logic.

FIG. 18 illustrates circuitry 280, the vertical data compression logic/timing, which forms part of block 60 in FIG. 1. Similarly to horizontal compression logic/timing circuit 146, static signals VCMD∅ and VCMD1 (vertical compression mode) and VELSZ1 and VELSZ∅ (vertical element size), which originate in the mode register circuitry 64 of FIG. 31, determine the timing of compression mode and resolution element size respectively. The input lines YMA12, NEWLNEN (FIG. 25), VCMD∅, VCMD1, VPASS, and FIELDN control the ACTVL output. This output is used by memory control logic 256 (FIG. 27) to control the WRN (write read enable) signal output therefrom. The other outputs of circuit 280, the ACCSUM and the ACCMAX lines, function in a like manner to the outputs of the horizontal compression logic/timing circuit 146. However, the vertical compression circuitry 60 always writes a whole word into the memory when in the "MAX" mode, while the horizontal compression circuitry 54 only does so when it becomes necessary to replace the word presently in memory.

SPACIAL VERTICAL DATA COMPRESSION

Figure 20:
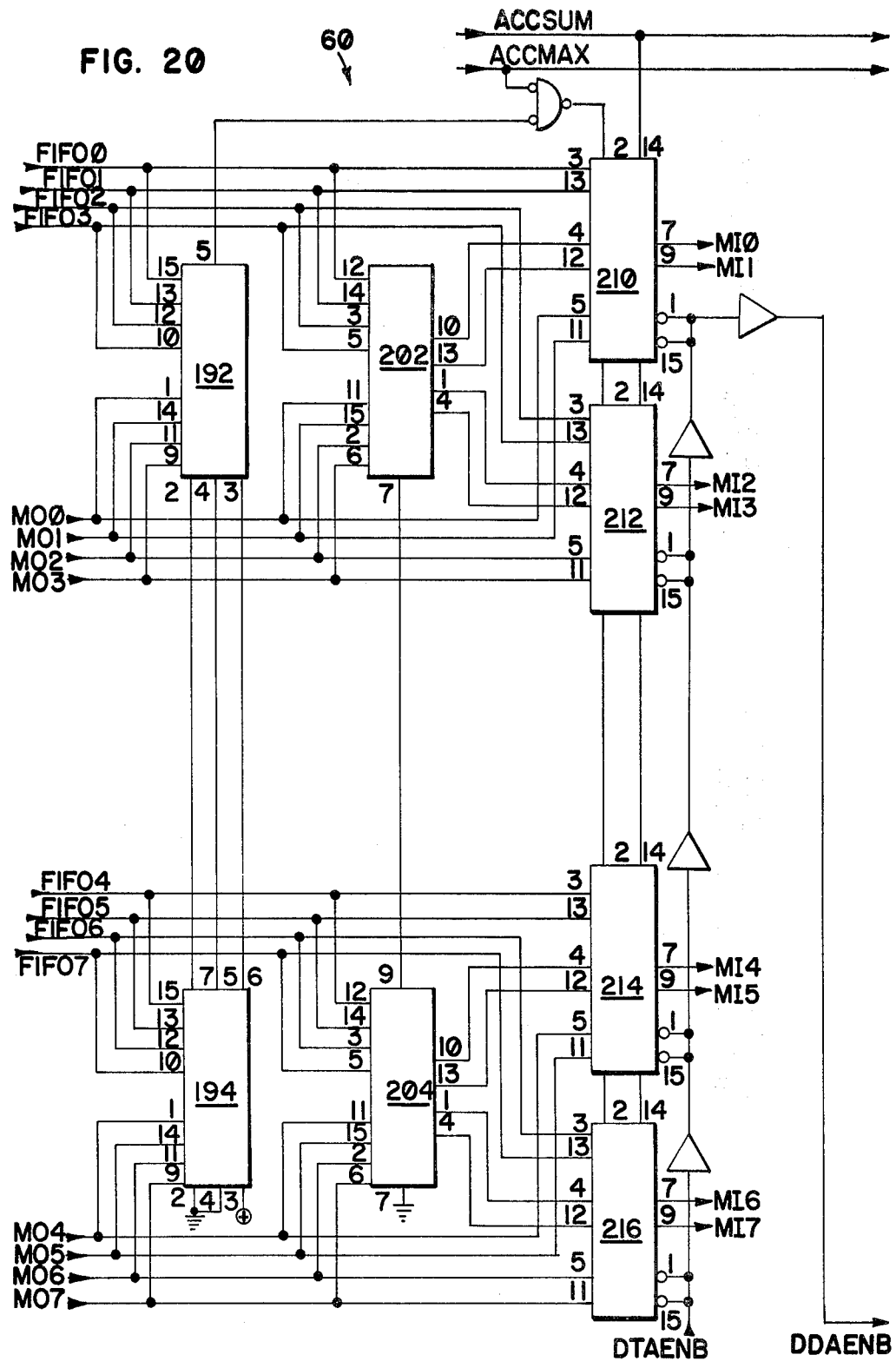
FIGS. 20 and 21 are schematic diagrams of the vertical data compression logic.
Figure 21:
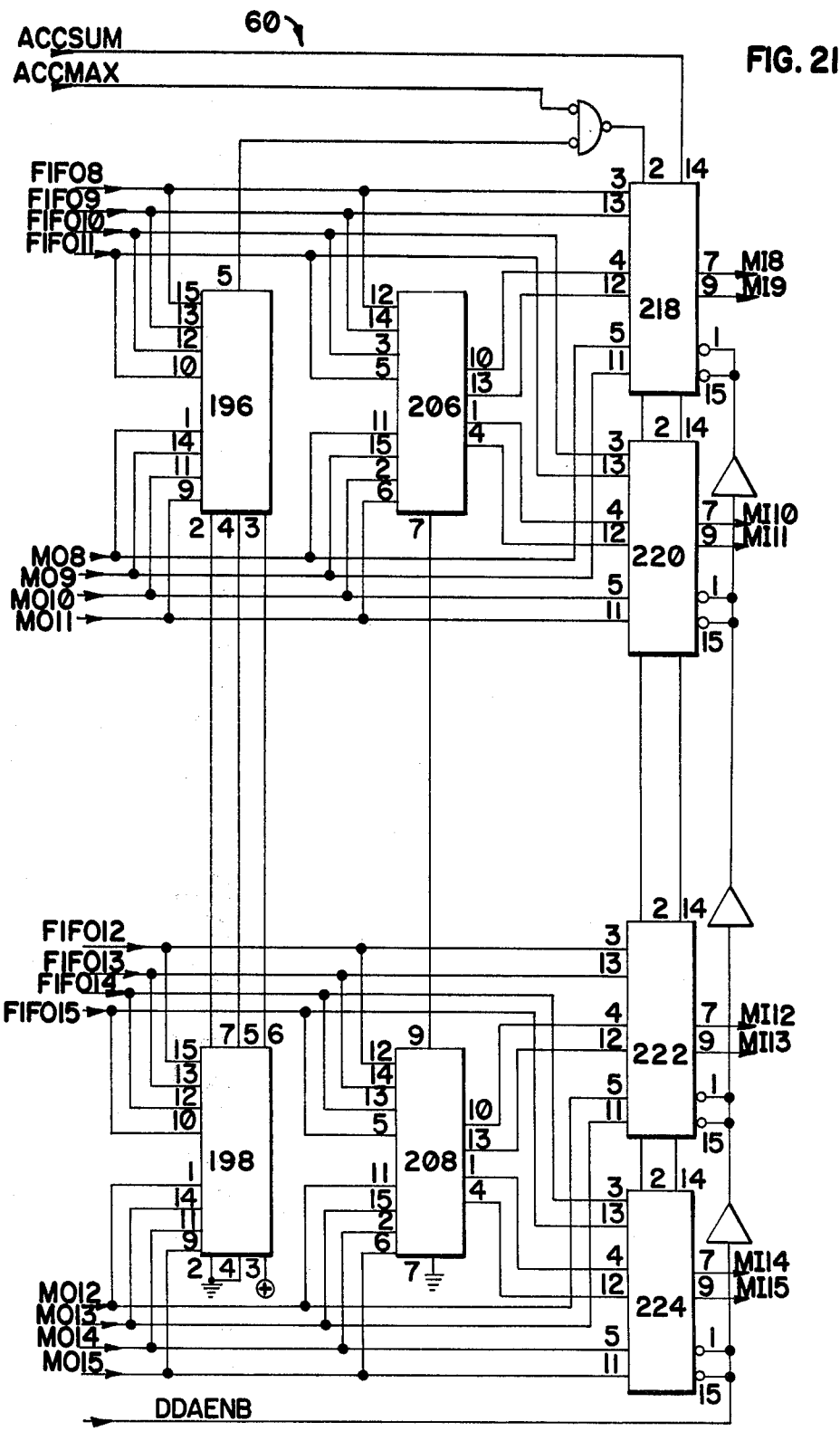
Figure 22:
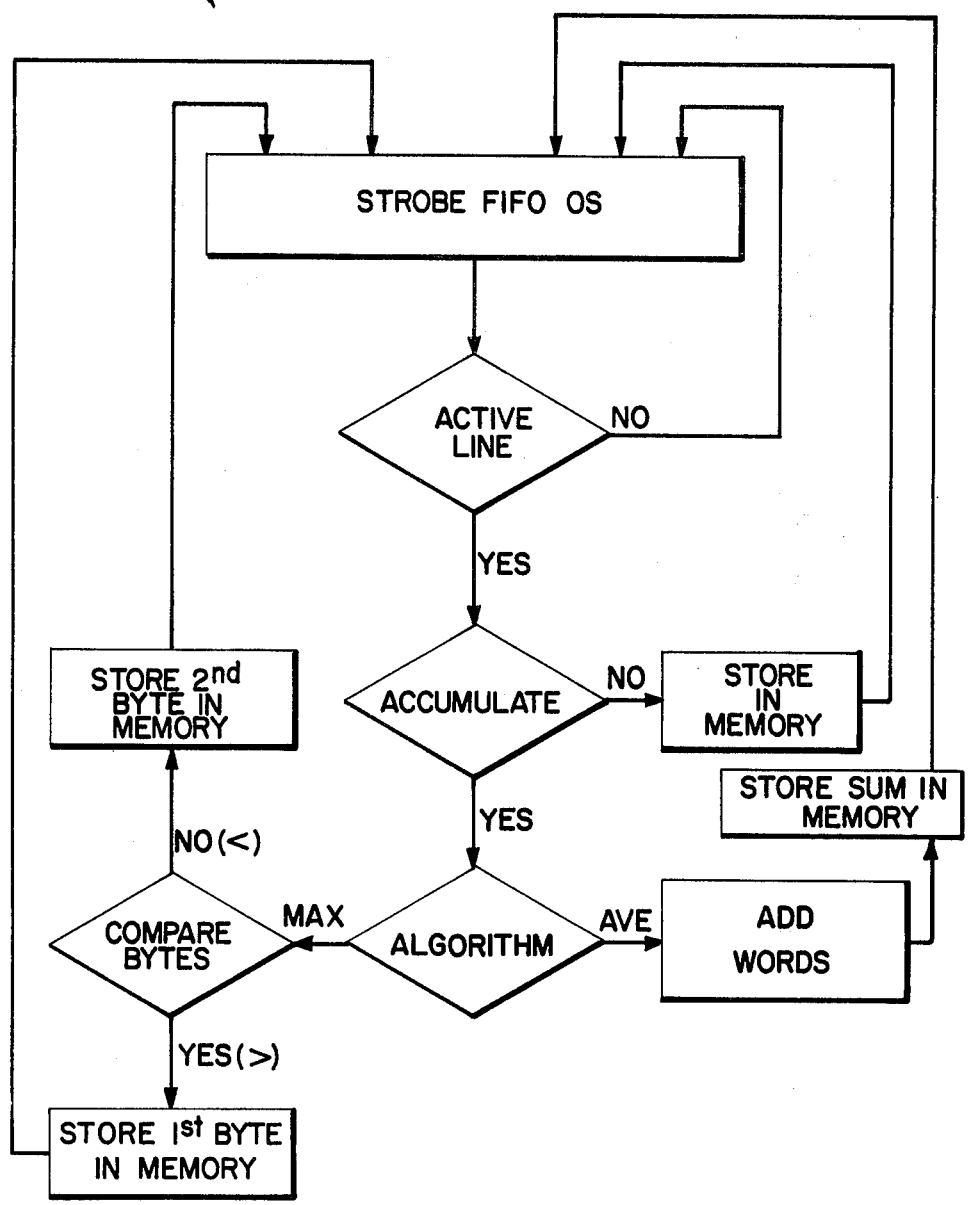
FIG. 22 is a flow graph illustrating the operation of the vertical compression logic.

The circuitry for the vertical compression logic 60 is shown in FIGS. 20-21 and in Flow Graph 179 in FIG. 22. Vertical compression logic 60 is slightly different from horizontal compression logic 152, primarily in its capability to handle up to two 8-bit digitized pixels in a parallel mode. The circuit is controlled by the ACCSUM, ACCMAX and DTAENB (generated by circuit 254 of FIG. 26) inputs, and has two sources of data input, one being the outputs FIFO∅-15 from the FIFO buffers 180-186, the other memory 62 outputs MO∅--MO15, which are standard. In the "SAMPLE" mode of compression the inputs FIFO∅-15 are applied to multiplexors 210-216 and 218-224. The multiplexors then pass the input through to the memory 62 inputs MI∅-15, again standard, to be stored for later recovery. Where comparison using the MAX scheme is employed, the recovery of pixel luminosity data stored in memory 62 is required to be compared with the output of the FIFO buffers 180-186. The comparison takes place at magnitude comparators 192-194 and 196-198. The outputs of the magnitude comparators 226 and 228 instruct the multiplexors to load the largest of the two compared inputs either FIFO∅-7 or MO∅-7 and FIFO 8-15 or MO8-15 (two independent decisions) into memory 62. In the "AVE" mode, circuitry 60 functions similarly to horizontal compression logic 152. It should be noted that no dividing circuitry (like circuit 174 of FIG. 16) is necessary because, as noted earlier, all division takes place in circuit 174. Flow graph 179 shown in FIG. 22 depicts the logical flow of information through vertical compression logic 60. The vertical compression logic acquires a sixteen-bit word from FIFO buffer 56 by strobing FIFO-OS line (as shown in FIG. 17). If in the "active" mode the logic progresses to the accumulate decision making step. The acquired word is then either stored in memory for later acquisition (e.g., when in the "SAMPLE" mode) or operated on according to the selected algorithm. The flow then continues essentially the same as earlier explained for the horizontal compression logic flow graph shown in FIG. 15. It is important to note, however, that the "MAX" mode compare step represents two independent decisions (i.e., one for each byte), although only one is explicitly represented.

TEMPORAL DATA COMPRESSION

In addition to its function of compressing data in any single frame (i.e. image), vertical compression logic 60 also provides the means for temporal data compression or compression of data from successive images. It does this much the same way if performs spacial data compression for a single image as previously explained, the only difference being that it recovers stored data for accumulation from a prior image versus a prior field. The principal signal controlling this type of data compression is the VPASS signal which is input to the vertical compression control logic 280 shown in FIG. 18.

The process of image subtraction is performed similarly to temporal compression. First, the reference frame is acquired in its "negative" form by inverting the output of the A/D convertor 40 by way of its input line ADINV (from mode register 64). Next, this reference frame is merely added to the successive "contrast medium" frames so that the resultant frames show only the tissue or organ retaining the contrast medium. The control of the subtraction function is accomplished by the minicomputer under the direction of the software. The process might also be done in the negative, i.e., to leave the reference frame in positive and invert successive frames.

MEMORY CONTROL

FIG. 19 shows the Y-address control logic. The logic functions to index the Y memory addressing circuit 240 (FIG. 24) and supply the YMA12 address input to circuit 254 of FIG. 26. Depending on the compression technique and compression mode, the logic is controlled by the mode register circuitry 64 outputs VCMDO and VCMD1 to employ the appropriate incrementation routine in response to the active inputs HDRN, FIELD, and NWLNEN.

Figure 24:
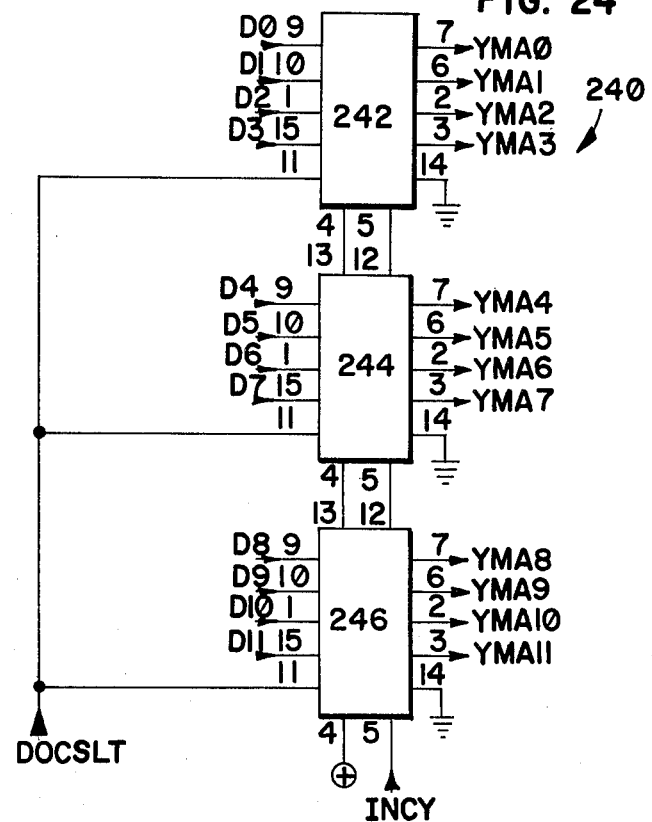
FIG. 24 is a schematic diagram of a portion of the memory address register 52 shown in FIG. 1.

FIG. 24 of the drawings shows a circuit 240 which forms part of the memory address register 52. The minicomputer generates a beginning address denoted D∅N-D15N which is inverted in the inverter buffer circuit 239 (FIG. 23) and applied to presettable synchronous up/down counters 242, 244, and 246. The outputs D∅-D15 from circuit 239 are also used in other of the system's circuits. The outputs of these counters are designated YMA∅-YMA11. The preset signal is provided by the signal DOCSLT received from circuit 268 of FIG. 28. The counters are incremented by application of the input signal INCY, which is generated by the Y Address control logic 251.

Figure 25:
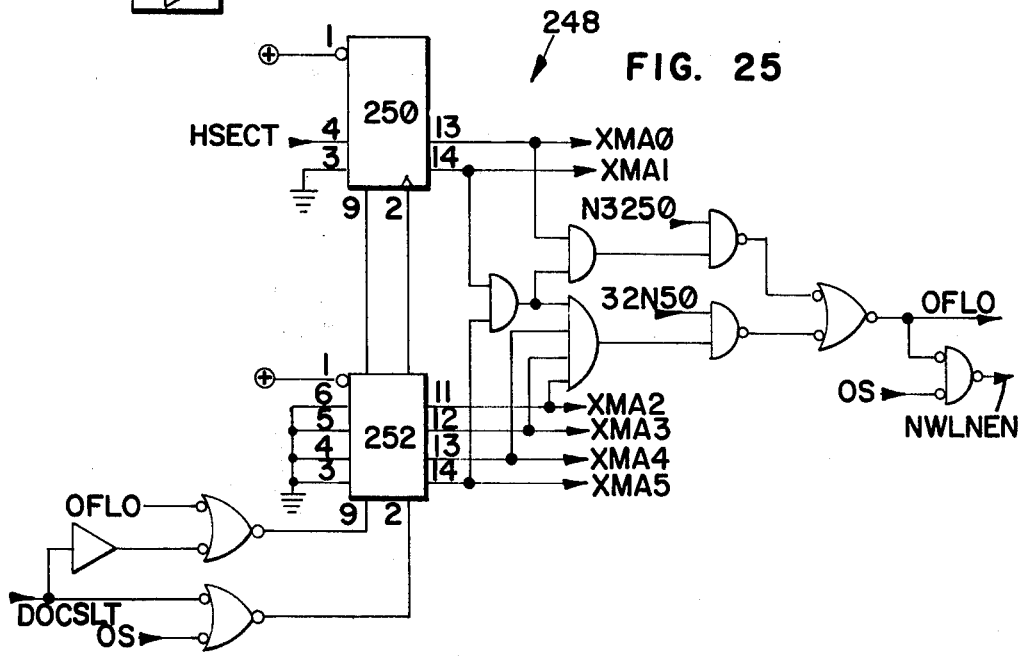
FIG. 25 is a schematic diagram of circuitry providing the X coordinate memory address.

FIG. 25 illustrates circuit 248 which provides the X coordinate memory address location XMA∅-5. Counters 250 and 252 which generate the X addresses are clocked by OS (FIFO output strobe) and are preset by the OFLO output or the signal DOCSLT (at the beginning of a new field). The static inputs 32N50 and N3250 from circuit 132 of FIG. 9 direct the memory address circuitry 248 to store either 32 or 50 image elements sequentially before indexing the Y address. Fifty is sometimes used in the dynamic imaging mode, but never in the static mode (a limitation of the memory). Thirty-two is usually employed (as a matter of convenience) when dynamic imaging and always used when static imaging. The output NWLNEN is generated in response to the logical combination of the OFLO and OS signals.

Figure 26:
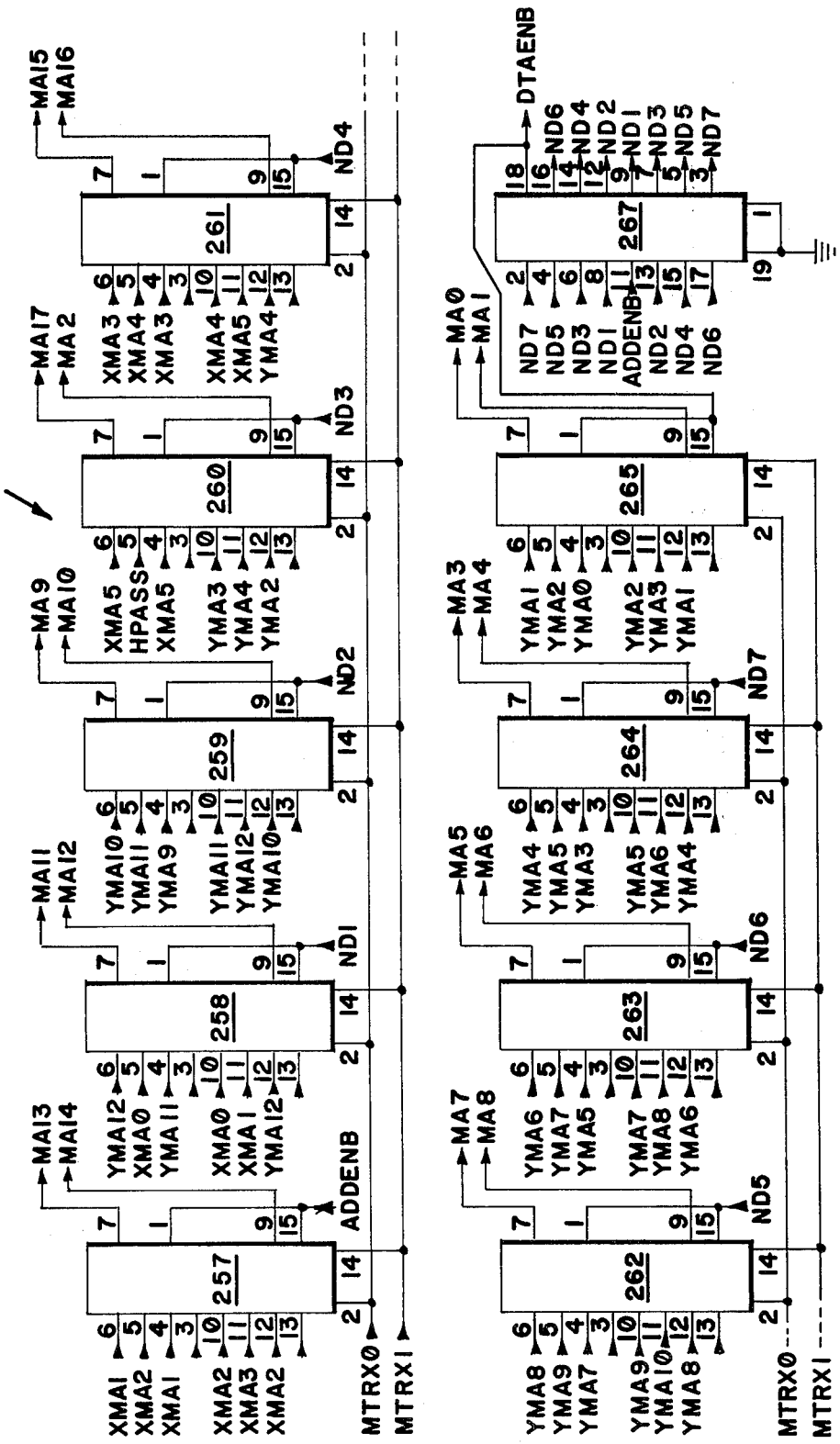
FIG. 26 is a schematic diagram which forms a part of memory address register 52 as shown in FIG. 1.
Figure 27:
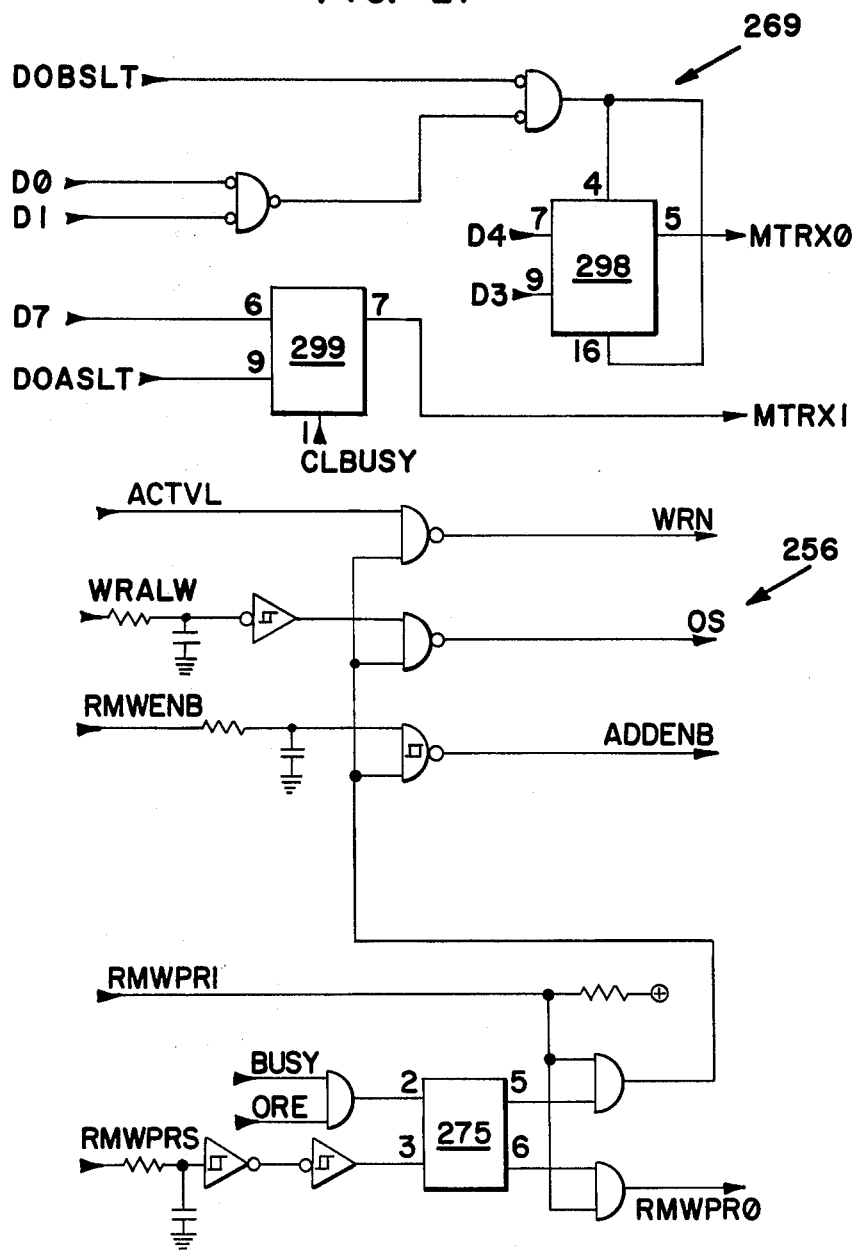
FIG. 27 is a schematic diagram of memory control logic.

FIG. 26 of the drawings illustrates circuit 254 which forms part of memory address register 52. Multiplexors 257-265 select one of three possible sets of X/Y addresses as determined by the presence or absence of signals MTRXO and MTRX1, which are produced in circuit 269 of FIG. 27. The output of circuit 254 is the 18-bit address, MA∅-MA17, which is used to address in memory 62 stored and retrieved data. The ADDENB input to circuit 254 is generated by memory control logic 256, which is also shown in FIG. 27. The inputs and outputs of circuit 267, ND1-ND7, are generated in response to the ADDENB signal, providing a delay period between enablement of the multiplexing circuits, and a delay before the DTAENB output is activated.

Memory control logic 256 as shown in FIG. 27 provides the FIFO output strobe signal OS used to clock data out of the FIFO buffers and into the vertical compression logic 60. The input lines WRALW, RMWENB, RMWPRI, and RMWPRS are connected to the standard $A^2$ memory output connections at connectors A36, A73, A6, and A34 respectively. Outputs WRN and RNWPRO are connected to the respective inputs B68 and B70 on the $A^2$ memory system. The ADDENB signal output from circuit 256 is fed into circuit 254 shown in FIG. 26 to enable the output addresses. The other inputs to circuit 256 are the BUSY and ORE signals which are used in conjunction with the other described signals to coordinate and synchronize data manipulation.

Reference may be had to the NOVA-Data General Cookbook 015-000009-09 App A Programmers' Reference, as earlier incorporated by reference, for elaboration of the above basic interface networks.

Referring to FIG. 28, decoder chip 287 receives minicomputer address lines DS∅N-DS5N and produces an active output on pin 14 of chip 287 when the binary coded number input thereto corresponds to the decimal device number 66. Circuit 268 inputs BOXSEL, STRT, CLR, DOA, DOB, DOC, DIA, DIB, IORST, and RQENBN are connected to the corresponding minicomputer outputs. The outputs of circuit 268 are input to the various circuits of the system.

Figure 29:
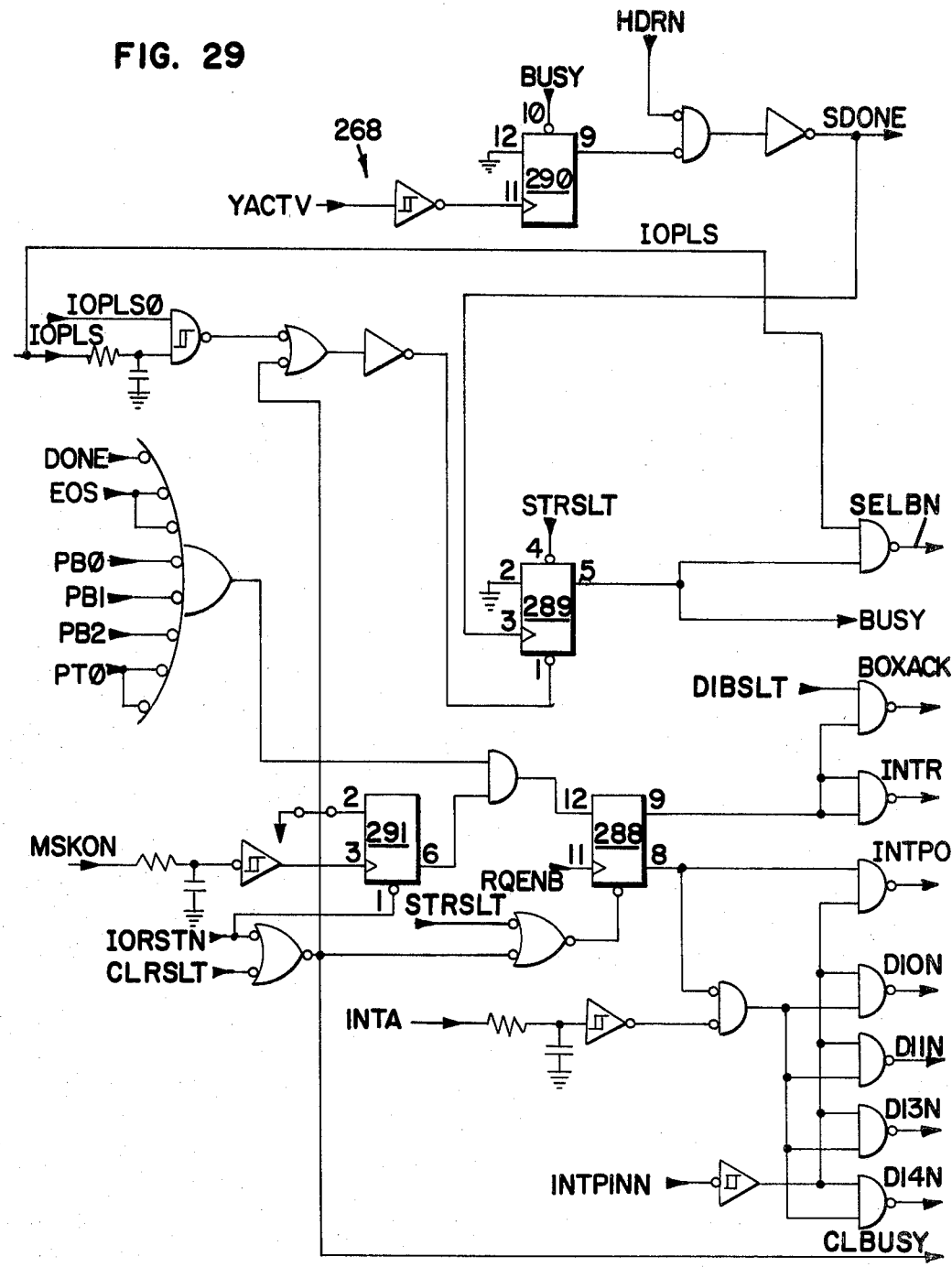
FIG. 29 is a schematic diagram of the remaining portion of the control circuitry shown in FIG. 28.

FIG. 29 shows the remainder of circuit 268. Inputs DONE, PB∅, PB1, PB2, and PT∅ are tapped from the corresponding outputs of circuit 270 (shown in FIG. 30). Inputs IORSTN, CLRSLT, RQENB, DIBSLT and IOPLS∅ are obtained from the portion of circuit 268 shown in FIG. 28. The other inputs MSK∅N, INTA, and INTPINN are connected to the corresponding minicomputer outputs. Outputs SELBN, INTR, D10N, D11N, D13N, and D14N are connected to the corresponding minicomputer connectors. Output BOXACK is connected to $A^2$ memory input B67.

Figure 30:
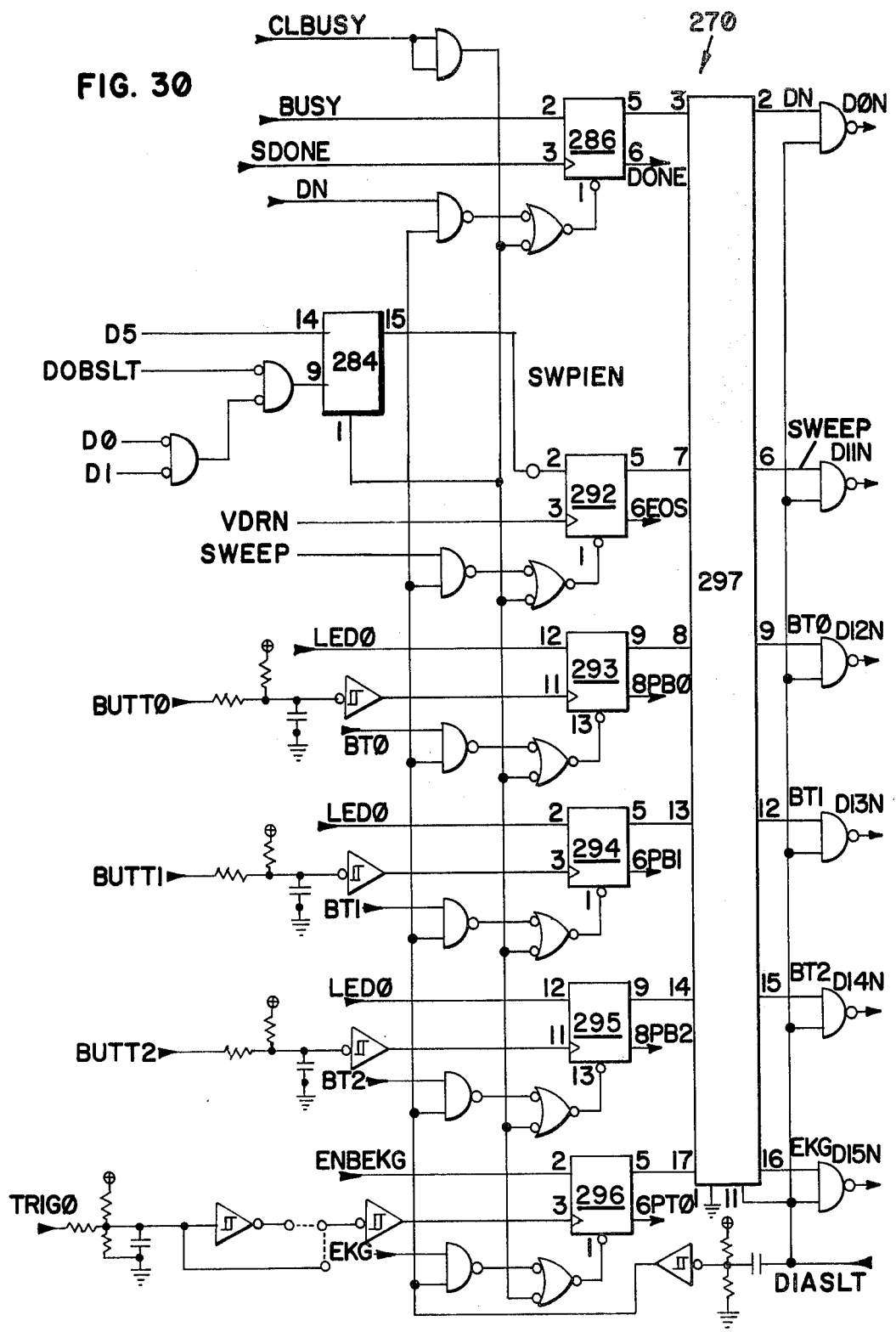
FIG. 30 is a schematic diagram of the static register control logic.

FIG. 30 of the drawing illustrates circuit 270 status register control logic which provides information from the interface to the minicomputer. Inputs CLBUSY and BUSY are input from circuit 268 of FIG. 29. Input SDONE is connected to the corresponding output of circuit 268. Input SWPIEN is generated by the corresponding circuitry. Inputs LED∅ and ENBEKG are also connected to the corresponding outputs of the mode register shown in FIG. 31. Inputs BUTT∅, BUTT1, and BUTT2 are controlled by three corresponding buttons on a user control box (not shown) and may be used for any purpose requiring a manual control. Input TRIG∅ is a physiological trigger input which may be connected to provide for synchronization of the digitization process to a physiological event. The other input DIASLT is connected to the corresponding output of circuit 268. Outputs D∅N and D11N-D15N are connected to the corresponding NOVA connectors.

FIG. 31 shows mode register circuitry 64. Inputs D∅-D15, DOASLT, and DOCSLT are derived from the corresponding minicomputer outputs already mentioned. Input CLBUSY is generated in circuit 268 of FIG. 29. Inputs DOASLT and DOCSLT are used to latch data into data latches 302, 304, 306, and 308. The corresponding output of these data latches is fed into the various circuits of the system for control thereof during the digitization process, as has already been discussed.

Appendix B includes the software program to be loaded into the minicomputer to interact with the hardware. The programs STULT and ULTSB comprise the static imaging control software. The HEAD, DYULT, USTR, and DYVSB programs comprise the dynamic imaging control software. The SULT and HWSUB programs comprise the static image subtraction software.

APPENDIX A

The following parts are suggested for the preferred embodiment. The numbers appearing next to leads of the components correspond to manufacturer's pin numbers. In the case of parts not listed here, it should be apparent, from their function, what type of component is required:

| Element No. | Type |
|---|---|
| 40 | TDC 1007J |
| 72 | LS 139 |
| 74 | LS 74 |
| 111 | LS 123 |
| 113 | LS 123 |
| 115 | LS 123 |
| 117 | LS 670 |
| 118 | LS 139 |
| 119 | LS 375 |
| 120 | LS 193 |
| 121 | LS 221 |
| 122 | LS 123 |
| 123 | LS 221 |
| 124 | LS 123 |
| 125 | LS 74 |
| 126 | LS 123 |
| 127 | LS 74 |
| 131 | LS 195 |
| 134 | LS 157 |
| 136 | LS 157 |
| 137 | LS 153 |
| 138 | LS 85 |
| 143 | LS 74 |
| 145 | LS 74 |
| 147 | LS 74 |
| 148 | S 74 |
| 149 | LS 74 |
| 150 | S 74 |
| 153 | LS 139 |
| 154 | RS 374 |
| 155 | LS 195 |
| 156 | LS 157 |
| 158 | LS 157 |
| 159 | LS 157 |
| 160 | LS 174 |
| 162 | LS 174 |
| 163 | LS 174 |
| 164 | LS 283 |
| 165 | LS 74 |
| 166 | LS 283 |
| 167 | LS 161 |
| 168 | LS 283 |
| 170 | LS 85 |
| 171 | S 74 |
| 172 | LS 85 |
| 176 a-h | LS 251 |
| 180 | MM 67401 A |
| 182 | MM 67401 A |
| 184 | MM 67401 A |
| 186 | MM 67401 A |
| 192 | LS 85 |
| 194 | LS 85 |
| 196 | LS 85 |
| 198 | LS 85 |
| 202 | LS 283 |
| 204 | LS 283 |
| 206 | LS 283 |
| 208 | LS 283 |
| 210 | LS 253 |
| 212 | LS 253 |
| 214 | LS 253 |
| 216 | LS 253 |
| 218 | LS 253 |
| 220 | LS 253 |
| 224 | LS 253 |
| 230 | LS 14 |
| 242 | LS 193 |
| 244 | LS 193 |
| 246 | LS 193 |
| 250 | LS 161 |
| 252 | LS 161 |
| 257 | LS 253 |
| 258 | LS 253 |
| 259 | LS 253 |
| 260 | LS 253 |
| 261 | LS 253 |
| 262 | LS 253 |
| 263 | LS 253 |
| 264 | LS 253 |
| 265 | LS 253 |
| 267 | LS 244 |
| 268 | LS 253 |
| 271 | LS 153 |
| 273 | LS 153 |
| 275 | LS 74 |
| 281 | LS 74 |
| 283 | LS 195 |
| 284 | LS 174 |
| 285 | LS 153 |
| 286 | LS 74 |
| 287 | LS 138 |
| 288 | LS 74 |
| 289 | LS 74 |
| 290 | LS 74 |
| 292 | LS 74 |
| 293 | LS 74 |
| 294 | LS 74 |
| 295 | LS 74 |
| 296 | LS 74 |
| 298 | LS 375 |
| 299 | LS 174 |
| 302 | LS 374 |
| 303 | LS 174 |
| 304 | LS 174 |
| 305 | LS 174 |
| 306 | LS 174 |
| 308 | LS 174 |

What is claimed is:

1. A system for digitizing a video signal of a plurality of horizontal scanning lines and storing the digitized signal in a computer memory comprising:
   (a) means for converting an analog signal to digital form to establish digital values corresponding to relative luminance of the video signal;
   (b) first counter means for establishing X-coordinates of a predetermined number of picture elements corresponding to a horizontal line;
   (c) means for assigning said luminance values to said corresponding X-coordinates;
   (d) means for resetting said first counter when said predetermined number is reached indicating the end of a scanning line;
   (e) second counter means incremented by said resetting means for establishing Y-coordinates corresponding to horizontal lines of said video signal, whereby a main matrix of picture elements having X and Y coordinates and a luminosity value is defined;
   (f) means for resetting said second counter when a predetermined number of horizontal lines is reached;
   (g) means for generating coordinates of a sub-matrix which falls within said matrix;
   (h) comparator means for generating an active signal for each picture element falling within said predefined sub-matrix region;
   (i) horizontal compression means activated by said active signal for comparing the luminance of successive groups of predetermined numbers of horizontally adjacent picture elements within said sub-matrix region and generating successive single horizontally compressed picture elements to be substituted for said groups;

(j) buffer means for serially receiving said horizontally compressed picture elements in real time and outputting said elements at a slower rate;

(k) vertical compression means for comparing groups of horizontally compressed picture elements which are vertically adjacent and for generating successive image elements to be substituted therefor;

(l) means for addressing and storing said image elements in a computer memory for later revival and restoration to a video image.

2. The system according to claim 1 wherein said horizontal and vertical means includes means for selecting the most luminous element of each group.

3. The system according to claim 1 wherein said horizontal and vertical compression means includes means for selecting the rightmost in each group of said horizontally adjacent picture elements and selecting the uppermost of each group of vertically adjacent compressed picture elements.

4. The system according to claim 1 wherein said comparator means compares the X-coordinate of the picture element to the generated sub-matrix coordinate periodically, said period being greater than one count on said first counter.

5. The system according to claim 1 wherein said horizontal and vertical compression means includes means for selecting the approximate average of each group of said elements.

6. A system according to claim 5 wherein said storing means includes:

(a) horizontal compression means for successively substituting a single luminance value for the luminance values of a predetermined number of horizontally adjacent picture elements;

(b) vertical compression means for successively substituting a single luminance value for the luminance value of a predetermined number of horizontally compressed picture elements to produce an image element; and (c) means for addressing and storing successive image elements in computer memory.

7. A system for digitizing a video signal and storing the signal in a computer memory comprising:

(a) an analog to digital converter for digitizing the amplitude corresponding to the varying luminance across a video line;

(b) means for generating from the video signal a first signal indicating the beginning of each horizontal line, a second signal indicating the next horizontal line, a third signal indicating the end of each image field, and a clock signal;

(c) horizontal coordinate counter reset by said first signal and incremented by said clock signal for counting up to a predetermined number;

(d) vertical coordinate counter incremented by said second signal and reset by said third signal to count to a predetermined number whereby said horizontal and vertical counters generate coordinates of a main matrix;

(e) means for assigning said coordinates to said digitized luminance values;

(f) means for generating boundary coordinates within said main matrix for defining a sub-matrix of interest;

(g) comparator means for successively comparing said boundary coordinates with the values in said counters to determine areas of intersection, and generate a fourth signal; and (h) means activated by said fourth signal for storing in computer memory said digital luminance values within said areas of intersection.

8. A system for compressing and recording video signals in a digital memory in real time, comprising:

(a) electronic memory for storing digital signals;

(b) means for electronically defining a portion of a video image to be recorded;

(c) means for producing a vertical active signal simultaneously with the beginning of a video line, said signal being generated whenever any part of said line falls within said defined portion of the video image;

(d) means activated by said vertical active signal for producing a horizontal active signal, said horizontal signal being generated during the interval the video signal is within said defined portion of the video image;

(e) digitizing means activated by said horizontal active signal for digitizing the video signal, producing a corresponding series of digital signals;

(f) first compression means activated by said horizontal active signal and operatively connected to said digitizing means for producing a horizontal replacement signal for replacement of a contiguous plurality of said digital signals;

(g) buffer means operatively connected to said first compression means for temporally buffering the transfer of said horizontal replacement signals from said first compression means;

(h) first memory interface means connected to said buffer means and said memory for transfering said horizontal replacement signals from said buffer means to said memory; and (i) second compression means activated by said vertical active signal and connected to said memory and said buffer for producing a vertical replacement signal for replacement in memory of a plurality of horizontal replacement signals received from said first compression means and said memory, said horizontal replacement signals corresponding to vertically contiguous video image areas.

9. A system for digitizing a video signal of successive images and subtracting from each a reference image and storing the result in a computer memory, comprising:

(a) means for converting an analog video signal to a digital form establishing a matrix of picture elements forming an image, each element having a numerical level corresponding to luminosity;

(b) means for reversing the mathematical signs corresponding to each numerical value so that a negative of said image is created;

(c) means for storing said values of said negative image in addressed locations in memory;

(d) image subtraction means for retrieving said negative values from memory, adding said negative values to values corresponding to the next successive image, and producing an image of composite values; and (e) means for storing said image of composite values in memory.

10. A system for compressing raw image data derived from successive video images comprising:

(a) conversion means for converting an analog signal representative of the said raw image data into corresponding raw digital luminosity values comprised of a plurality of gray-scale bits;

(b) matrix means for assigning matrix addresses to each of said digital values;

(c) sub-matrix means for dividing said main matrix in accordance with a predetermined image-independent format into a selected plurality of sub-matrices, each of which encompasses predetermined ones of said addresses; and (d) reduction means for compressing the raw digital luminosity values found in each of said sub-matrices into a plurality of compressed luminosity values comprised of a plurality of gray-scale bits wherein said sub-matrices are represented by a single compressed luminosity value.

11. A system as claimed in claim 10 wherein said reduction means provides a compressed luminosity value which is equal to the brightest value of all of the elements in a sub-matrix.

12. A system as claimed in claim 10 wherein said reduction means provides a compressed luminosity value which is substantially the average luminosity value for all elements in a sub-matrix.

13. A system as claimed in claim 10 wherein said reduction means produces a compressed luminosity value which is substantially equal to one of said luminosity values of a sub-matrix.

14. A system as claimed in claim 10 wherein said video images are formed from an interlaced scan and part of each sub-matrix is generated from each of the interlaced scan patterns that form said interlaced scan.

15. A system as claimed in claim 10 wherein said reduction means compresses the raw digital luminosity values into horizontal and vertical components in an independently adjustable manner.

16. A system for compressing and recording successive images formed from synchronous video signals in a digital memory in real time, comprising:

(a) electronic memory for storing digital signals;

(b) means for electronically defining a portion of a video image to be recorded;

(c) means for producing a vertical active signal simultaneously with the beginning of a video line, said signal being generated whenever any part of said line falls within said defined portion of the video image;

(d) means activated by said vertical active signal for producing a horizontal active signal, said horizontal signal being generated during the interval the video signal is within said defined portion of the video image;

(e) digitizing means activated by said horizontal active signal for digitizing the video signal, producing a corresponding series of digital signals;

(f) first compression means activated by said horizontal active signal and operatively connected to said digitizing means for producing a horizontal replacement signal for replacement of a contiguous plurality of said digital signals;

(g) buffer means operatively connected to said first compression means for temporally buffering the transfer of said horizontal replacement signals from said first compression means;

(h) first memory interface means connected to said buffer means and said memory for transferring said horizontal replacement signals from said buffer means to said memory; and (i) second compression means activated by said vertical active signal and connected to said memory and said buffer for producing a vertical replacement signal for replacement in memory of a plurality of horizontal replacement signals received from said first compression means and said memory, said horizontal replacement signals corresponding to vertically contiguous video image areas.

* * * * *

UNITED STATES PATENT AND TRADEMARK OFFICE
CERTIFICATE OF CORRECTION

PATENT NO. : 4,417,276                    Page 1 of 2

DATED : 22 November 1983

INVENTOR(S) : Matthew C. Bennett, et al.

It is certified that error appears in the above-identified patent and that said Letters Patent is hereby corrected as shown below:

Column 1, line 23, "analysed" should be --analyzed--.
Column 2, line 42, after "accompanying" insert --drawing--.
Column 3, line 33, ";" should be --.--.
Column 4, line 12, "accomodate" should be --accommodate--.
Column 6, line 42, "observeable" should be --observable--.
Column 6, line 43, "observeable" should be --observable--.
Column 7, line 4, "work" should be --word--.
Column 7, line 7, "accomodate" should be --accommodate--.
Column 7, line 17, "matcrices" should be --matrices--.
Column 8, lines 32-33, "curcuitry" should be --circuitry--.
Column 8, line 57, after "HDRN," insert --HDR--.
Column 8, line 66, after "compression" insert --circuit--.

UNITED STATES PATENT AND TRADEMARK OFFICE
CERTIFICATE OF CORRECTION

PATENT NO. : 4,417,276          Page 2 of 2

DATED       : 22 November 1983

INVENTOR(S) : Matthew C. Bennett, et al.

It is certified that error appears in the above-identified patent and that said Letters Patent is hereby corrected as shown below:

```
Column 9, line 9, "be" should be --by--.
Column 9, lines 62-63, "freuency" should be --frequency--.
Column 10, line 65, after "36" insert --are--.
Column 11, line 3, after "produce" insert --an output--.
Column 11, line 37, "memory 61" should be --memory 62--.
Column 14, line 50, "temporal" should be --temporal--.
```

Signed and Sealed this

Nineteenth Day of February 1985

[SEAL]

Attest:

DONALD J. QUIGG

Attesting Officer     Acting Commissioner of Patents and Trademarks